(12) United States Patent
Morimoto

(10) Patent No.: US 7,337,287 B2
(45) Date of Patent: Feb. 26, 2008

(54) STORAGE UNIT, STORAGE UNIT CONTROL METHOD, AND STORAGE SYSTEM

(75) Inventor: Hiroyuki Morimoto, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 10/816,913

(22) Filed: Apr. 5, 2004

(65) Prior Publication Data
US 2005/0166016 A1    Jul. 28, 2005

(30) Foreign Application Priority Data
Jan. 28, 2004  (JP) ............................. 2004-019739

(51) Int. Cl.
   *G06F 12/16* (2006.01)
(52) U.S. Cl. ...................... 711/162; 711/161; 711/114; 714/6
(58) Field of Classification Search ................ 711/162, 711/114, 161; 714/6
   See application file for complete search history.

(56) References Cited

U.S. PATENT DOCUMENTS

| | | |
|---|---|---|
| 2002/0059539 A1 | 5/2002 | Anderson |
| 2002/0169925 A1 | 11/2002 | Achiwa et al. ............. 711/112 |
| 2003/0200478 A1 | 10/2003 | Anderson |
| 2003/0220985 A1* | 11/2003 | Kawamoto et al. ......... 709/219 |
| 2003/0221061 A1 | 11/2003 | El-Batal et al. |
| 2004/0123063 A1 | 6/2004 | Dalal et al. |
| 2004/0177218 A1* | 9/2004 | Meehan et al. ............. 711/114 |
| 2005/0086567 A1 | 4/2005 | Cronch |

FOREIGN PATENT DOCUMENTS

JP    2002-259183    9/2002

OTHER PUBLICATIONS

Massiglia, Paul. "The RAID Book" 1997 , 6th Edition, pp. 111, 116-128.*
Patterson, David. "A Case for Redundant Arrays of Inexpensive Disks (RAID)", 1988 pp. 109-116.*

* cited by examiner

Primary Examiner—Sanjiv Shah
Assistant Examiner—Jae Un Yu
(74) Attorney, Agent, or Firm—Mattingly, Stanger, Malur & Brundidge, P.C.

(57) ABSTRACT

A storage unit connected to other storage units, each having of first disk drives, includes second disk drives; a first receiving unit receiving copies of first storage data, stored in storage blocks created by logically partitioning a data storage area of the first disk drives, and first identifiers identifying the storage blocks, from the other storage units; a first operation controller calculating an exclusive OR of the copies of the first storage data, with a correspondence established among the first identifiers, from the copies of the first storage data received by the first receiving unit; and a first storage controller storing a calculation result of the exclusive OR from the first operation controller, into storage blocks of the second disk drives having second identifiers that correspond to the first identifiers and that individually identify storage blocks created by logically partitioning a data storage area of the second disk drives.

15 Claims, 28 Drawing Sheets

PARITY GROUP MANAGEMENT TABLE 710

| DATA STORING STORAGE UNIT | STORAGE UNIT 1, STORAGE UNIT 2, STORAGE UNIT 3 |
|---|---|
| PARITY STORING STORAGE UNIT | STORAGE UNIT 4 |

FIG. 11

PARITY BLOCK MANAGEMENT TABLE 720

| PARITY BLOCK LENGTH = 512 BYTES ||
|---|---|
| NUMBER OF PARITY BLOCKS = 800000 ||
| LOGICAL VOLUME NUMBER | FIRST PARITY BLOCK NUMBER |
| 0000 | 0 |
| 0001 | 4096 |
| 0002 | 16384 |
| 0003 | 40000 |
| 0004 | 81920 |
| ⋮ | ⋮ |

FIG. 12

PARITY BLOCK COUNT GENERAL MANAGEMENT TABLE 730

| STORAGE UNIT | NUMBER OF PARITY BLOCKS |
|---|---|
| STORAGE UNIT 1 | 500000 |
| STORAGE UNIT 2 | 600000 |
| STORAGE UNIT 3 | 700000 |
| STORAGE UNIT 4 | 800000 |

FIG. 13A

740 INITIAL DATA MANAGEMENT TABLE

| STORAGE UNIT | RECALCULATION |
|---|---|
| STORAGE UNIT 1 | OFF |
| STORAGE UNIT 2 | OFF |
| STORAGE UNIT 3 | ON |
| ⋮ | ⋮ |

FIG. 13B

INITIAL DATA MANAGEMENT TABLE 740

| STORAGE UNIT | RECALCULATION | RECALCULATION |
|---|---|---|
| STORAGE UNIT 1 | OFF | — |
| STORAGE UNIT 2 | OFF | — |
| STORAGE UNIT 3 | ON | 123456 |
| ⋮ | ⋮ | ⋮ |

FIG. 13C

740 INITIAL DATA MANAGEMENT TABLE

| STORAGE UNIT | RECALCULATION |
|---|---|
| STORAGE UNIT 1 | OFF |
| STORAGE UNIT 2 | OFF |
| STORAGE UNIT 3 | ON |
| ⋮ | ⋮ |

| PARITY BLOCK NUMBER | RECALCULATION COMPLETED |
|---|---|
| 0 | COMPLETED |
| 1 | NOT COMPLETED |
| 2 | COMPLETED |
| ⋮ | ⋮ |
| 699999 | COMPLETED |

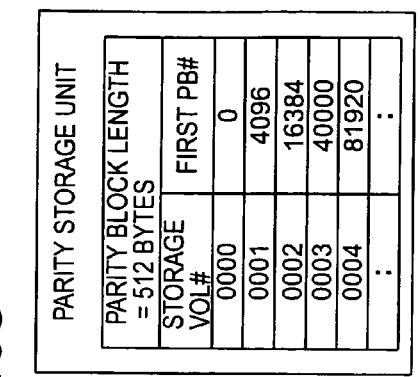
FIG. 16A
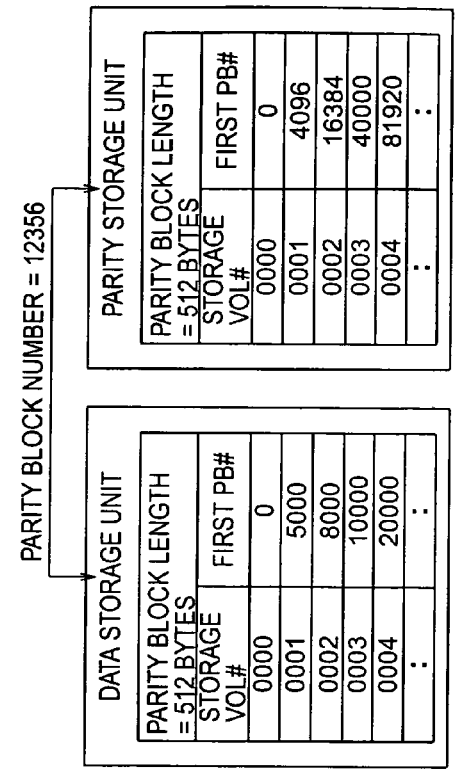
FIG. 16C
FIG. 16B
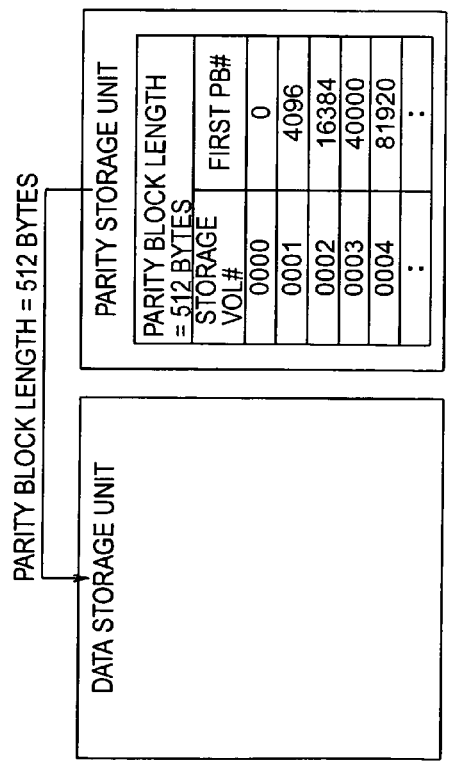
FIG. 16D

FIG. 17A

PARITY STORAGE UNIT

| STORAGE VOL# | PARITY BLOCK LENGTH = 512 BYTES | |
|---|---|---|
| | | FIRST PB# |
| 0000 | | 0 |
| 0001 | | 4096 |
| 0002 | | 16384 |
| 0003 | | 40000 |
| 0004 | | 81920 |
| .. | | .. |

FIG. 17B

PARITY STORAGE UNIT

| STORAGE VOL# | PARITY BLOCK LENGTH = 512 BYTES | |
|---|---|---|
| | | FIRST PB# |
| 0000 | | 0 |
| 0001 | | 4096 |
| 0002 | | 16384 |
| 0003 | | 40000 |
| 0004 | | 81920 |
| .. | | .. |

NUMBER OF PARITY BLOCKS = 8000000

DATA STORAGE UNIT

PARITY BLOCK LENGTH = 512 BYTES

FIG. 17C

PARITY STORAGE UNIT

| STORAGE VOL# | PARITY BLOCK LENGTH = 512 BYTES | |
|---|---|---|
| | | FIRST PB# |
| 0000 | | 0 |
| 0001 | | 4096 |
| 0002 | | 16384 |
| 0003 | | 40000 |
| 0004 | | 81920 |
| .. | | .. |

DATA STORAGE UNIT

| STORAGE VOL# | PARITY BLOCK LENGTH = 512 BYTES | |
|---|---|---|
| | | FIRST PB# |
| 0000 | | 0 |
| 0001 | | 5000 |
| 0002 | | 8000 |
| 0003 | | 10000 |
| 0004 | | 20000 |
| .. | | .. |

NUMBER OF PARITY BLOCKS = 5000000

FIG. 17D

PARITY STORAGE UNIT

| STORAGE VOL# | PARITY BLOCK LENGTH = 512 BYTES | |
|---|---|---|
| | | FIRST PB# |
| 0000 | | 0 |
| 0001 | | 4096 |
| 0002 | | 16384 |
| 0003 | | 40000 |
| 0004 | | 81920 |
| .. | | .. |

NUMBER OF PARITY BLOCKS = 8000000

CONNECTABLE

DATA STORAGE UNIT

| STORAGE VOL# | PARITY BLOCK LENGTH = 512 BYTES | |
|---|---|---|
| | | FIRST PB# |
| 0000 | | 0 |
| 0001 | | 5000 |
| 0002 | | 8000 |
| 0003 | | 10000 |
| 0004 | | 20000 |
| .. | | .. |

NUMBER OF PARITY BLOCKS = 5000000

FIG. 22A

PARITY STORAGE UNIT

PARITY BLOCK LENGTH = 512 BYTES

| STORAGE VOL# | FIRST PB# |
|---|---|
| 0000 | 0 |
| 0001 | 4096 |
| 0002 | 16384 |
| 0003 | 40000 |
| 0004 | 81920 |
| .. | .. |

NUMBER OF PARITY BLOCKS = 8000000

FIG. 22B

PARITY BLOCK LENGTH = 512 BYTES
NUMBER OF PARITY BLOCKS = 800000

PARITY STORAGE UNIT

PARITY BLOCK LENGTH = 512 BYTES

| STORAGE VOL# | FIRST PB# |
|---|---|
| 0000 | 0 |
| 0001 | 4096 |
| 0002 | 16384 |
| 0003 | 40000 |
| 0004 | 81920 |
| .. | .. |

NUMBER OF PARITY BLOCKS = 8000000

DATA STORAGE UNIT

FIG. 22C

PARITY STORAGE UNIT

PARITY BLOCK LENGTH = 512 BYTES

| STORAGE VOL# | FIRST PB# |
|---|---|
| 0000 | 0 |
| 0001 | 4096 |
| 0002 | 16384 |
| 0003 | 40000 |
| 0004 | 81920 |
| .. | .. |

NUMBER OF PARITY BLOCKS = 8000000

DATA STORAGE UNIT

PARITY BLOCK LENGTH = 512 BYTES

| STORAGE VOL# | FIRST PB# |
|---|---|
| 0000 | 0 |
| 0001 | 5000 |
| 0002 | 8000 |
| 0003 | 10000 |
| 0004 | 20000 |
| .. | .. |

NUMBER OF PARITY BLOCKS = 5000000

FIG. 22D

CONNECTABLE

PARITY STORAGE UNIT

PARITY BLOCK LENGTH = 512 BYTES

| STORAGE VOL# | FIRST PB# |
|---|---|
| 0000 | 0 |
| 0001 | 4096 |
| 0002 | 16384 |
| 0003 | 40000 |
| 0004 | 81920 |
| .. | .. |

NUMBER OF PARITY BLOCKS = 8000000

DATA STORAGE UNIT

PARITY BLOCK LENGTH = 512 BYTES

| STORAGE VOL# | FIRST PB# |
|---|---|
| 0000 | 0 |
| 0001 | 5000 |
| 0002 | 8000 |
| 0003 | 10000 |
| 0004 | 20000 |
| .. | .. |

NUMBER OF PARITY BLOCKS = 5000000

STORAGE UNIT, STORAGE UNIT CONTROL METHOD, AND STORAGE SYSTEM

BACKGROUND OF THE INVENTION

The present invention relates to a storage unit, a storage unit control method, and a storage system.

Data is backed up so that the original data can be restored when data stored in a storage unit is lost. This data backup is usually performed by storing a copy of data, stored in a storage unit, also in a backup storage unit.

A technology for backing up data using the replication technology has also been developed. Replication is a technology for writing data on two storage units, connected communicably to each other, in such a way that, when data is written on one storage unit, a copy of the data is sent to the other storage unit and is written also on the other storage unit.

JP-A-2002-259183 and the corresponding U.S. patent application publication No. 2002/0169925A1 discloses an example of a storage unit.

SUMMARY OF THE INVENTION

However, when there are multiple storage units on which original data to be backed up is stored, the backup storage unit must have a storage capacity large enough to store a copy of all original data stored on those storage units.

When the replication technology is used to back up data, each storage unit on which original data to be backed up is stored must have a storage unit with which to pair.

This means that backing up data requires the maintenance and management of many storage units and increases the maintenance and management cost.

Today, in view of a rapidly increasing amount of data processed by information processing systems, there is a strong need for a technology for streamlining data backup, decreasing the backup cost and, in addition, decreasing the overall information processing system cost.

In view of the problems described above, it is a main object of the present invention to provide a storage unit, a storage unit control method, and a storage system.

To solve the above problem, the present invention provides a storage unit connected communicably to a plurality of other storage units each having a plurality of first disk drives. The storage unit includes a plurality of second disk drives in which data is stored; a first receiving unit that receives copies of first storage data, stored in a plurality of storage blocks created by logically partitioning a data storage area of the plurality of first disk drives, as well as first identifiers that identify the storage blocks, from the other storage units; a first operation controller that calculates an exclusive OR of the copies of the first storage data, with a correspondence established among the first identifiers, from the copies of the first storage data received by the first receiving unit from each of the other storage units; and a first storage controller that stores a calculation result of the exclusive OR, calculated by the first operation controller, into storage blocks of the second disk drives having second identifiers that correspond to the first identifiers and that individually identify a plurality of storage blocks created by logically partitioning a data storage area of the plurality of second disk drives.

Other problems and solutions disclosed by this application will become apparent from the description of the embodiments and the attached drawings.

The present invention provides a storage unit, a storage unit control method, and a storage system.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram showing a parity block management table in the embodiment.

FIG. 12 is a diagram showing a parity block count general management table in the embodiment.

FIGS. 13A, 13B, and 13C are diagrams showing initial data management tables in the embodiment.

FIGS. 16A, 16B, 16C, and 16D are diagrams showing the contents of processing in the storage unit in the embodiment.

FIGS. 17A, 17B, 17C, and 17D are diagrams showing the contents of processing in the storage unit in the embodiment.

FIGS. 22A, 22B, 22C and 22D are diagrams showing the contents of processing in the storage unit in the embodiment.

DESCRIPTION OF THE EMBODIMENTS

===Example of General Configuration===

Figure 1:
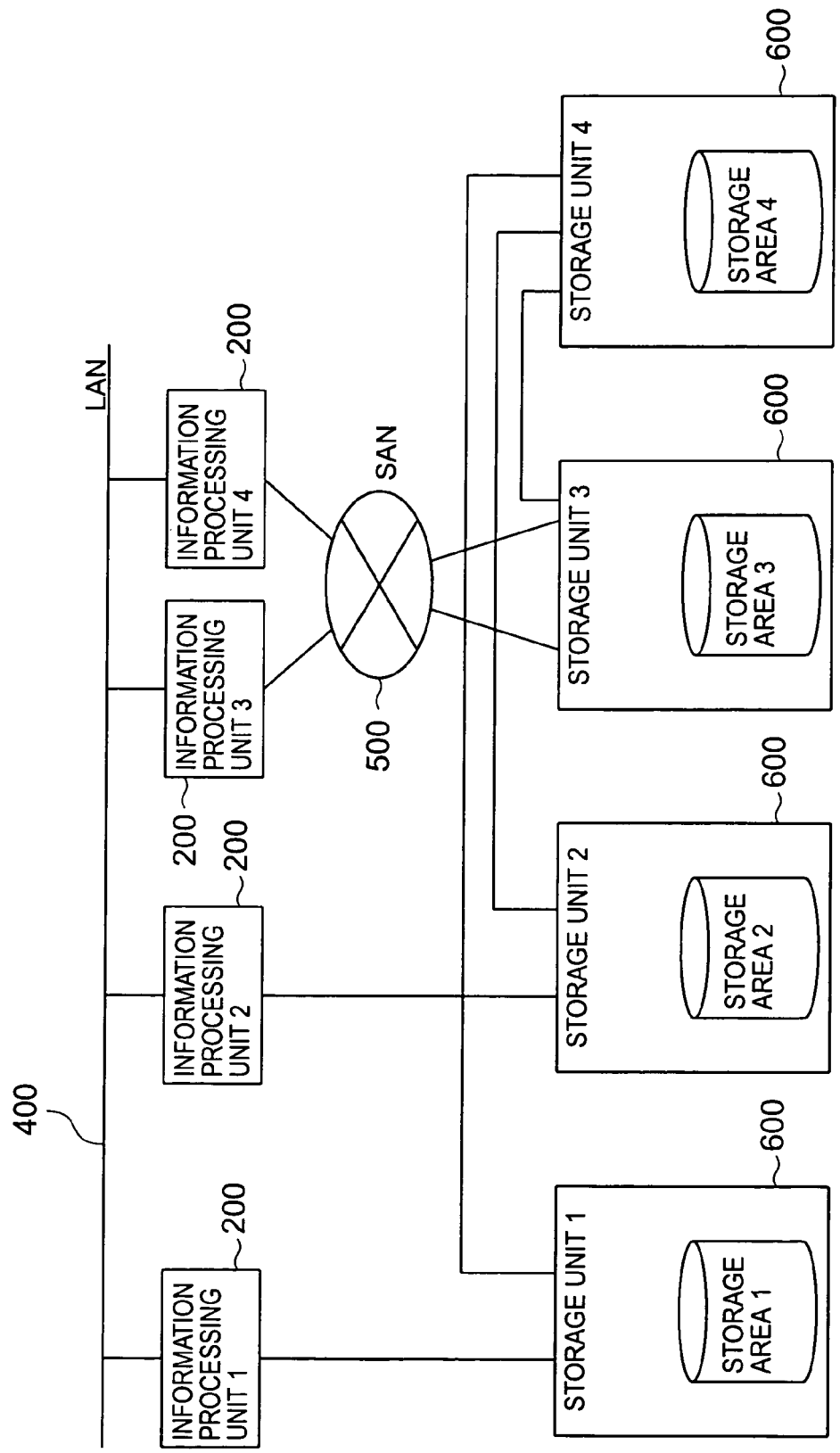
FIG. 1 is a block diagram showing the general configuration of an information processing system in an embodiment.

First, FIG. 1 shows a block diagram showing the general configuration of an information processing system including storage units 600 in this embodiment. The information processing system in this embodiment comprises a storage system composed of a plurality of storage units 600; and information processing units 200 each connected communicably to a storage unit 600.

The storage system in this embodiment comprises storage units 1-4 (600). Information processing units 1-4 (200) are connected communicably to storage units 1-3 (referred to as other storage units or first storage units; hereinafter also called data storage units) (600). Information processing unit 1 (200) is connected to storage unit 1 (600), information processing unit 2 (200) is connected to storage unit 2 (600), and information processing units 3 and 4 (200) are connected to storage unit 3 (600). Each information processing unit 200 sends a data input/output request to the storage unit 600 to which it is communicably connected. In response to a data input/output request from the information processing unit 200, each storage unit 600 writes or reads data to or from the storage area (also called a data storage area) provided in the storage unit 600.

The information processing unit 200 is an information apparatus, such as a computer, that comprises a CPU (Central Processing Unit) and a memory. The CPU of the information processing unit 200 executes many applications to implement various functions. The functions implemented by the information processing unit 200 include an automated teller service in a bank, an airline seat reservation service, and so on. The information processing unit 200 may be a personal computer, a workstation, or a mainframe computer.

Storage unit 3 (600) is connected communicably to information processing units 3 and 4 (200) via a SAN (Storage Area Network) 500. Communication between the information processing unit 200 and the storage unit 600 via the SAN 500 may be performed according to the fiber channel protocol. In this case, the SAN 500 comprises at least one communication apparatus, such as a switch, conforming to the fiber channel protocol. Information processing units 3 and 4 (200) send a data input/output request to storage unit 3 (600) according to the fiber channel protocol.

Of course, it is also possible to connect information processing units 3 and 4 (200) to storage unit 3 (600) not via the SAN 500. In this case, it is also possible to perform communication between information processing units 3 and 4 (200) and storage unit 3 (600) via a communication protocol such as FICON (Fibre Connection) (registered trademark), ESCON (Enterprise System Connection) (registered trademark), TCP/IP (Transmission Control Protocol/Internet Protocol), and iSCSI (Internet Small Computer Systems Interface).

Of course, it is also possible to perform communication between information processing unit 1 (200) and storage unit 1 (600) and between information processing unit 2 (200) and storage unit 2 (600) via the fiber channel protocol or a communication protocol such as FICON (registered trademark), ESCON (registered trademark), TCP/IP, and iSCSI.

As shown in FIG. 1, it is also possible to communicably connect information processing units 1-4 (200) via a LAN (Local Area Network) 400. For example, the LAN 400 may be the Internet.

The number of information processing units 200 connected to each storage unit 600 need not be the number shown in FIG. 1 but any number of units may be connected. Similarly, any number of storage units 600 may be connected to each information processing unit 200.

Storage unit 4 (a second storage unit, hereinafter also called a parity storage unit) (600) is connected communicably to storage units 1-3 (600). The storage area of storage unit 4 (600) in this embodiment contains data for backing up data stored in the storage areas of storage units 1-3 (600) (other storage units).

That is, as will be described later in detail, storage unit 4 (600) in this embodiment contains the calculation result of the exclusive OR of the data stored in the storage areas of storage units 1-3 (600). If it is required to restore the data stored in the storage area of any one of storage units 1-3, for example, to restore the data stored in the storage area of storage unit 1 (600), the data stored in the storage areas of storage units (600) other than storage unit 1 (600), that is, the data in the storage areas of storage units 2-4 (600), is exclusively ORed to restore the data stored in the storage area of storage unit 1 (600).

This is expressed by an expression as follows. That is, let D1 be data stored in storage unit 1 (600), let D2 be data stored in storage unit 2 (600), and let D3 be data stored in storage unit 3 (600). Then, D4, which is data stored in storage unit 4 (600), is expressed as D1(EXOR)D2(EXOR)D3, where "EXOR" is an operator representing the exclusive OR operation. To restore D1, the operation D4(EXOR)D2(EXOR)D3 is performed. This operation restores D1.

In this way, data stored in the storage areas of the other storage units (600) can be backed up in this embodiment no matter how many other storage units 600 are connected communicably to the storage unit 4 (600).

Storage unit 4 (600) can be thought of as a special storage unit 600 for storing data used to back up data stored in the storage areas of storage units 1-3 (600). Alternatively, as with storage units 1-3 (600), storage unit 4 (600) can also be thought of as a storage unit 600, connected communicably to the information processing unit 200, that has a storage area to or from which data can be written or read in response to a data input/output request from the information processing unit 200.

===Storage Unit===

Figure 2:
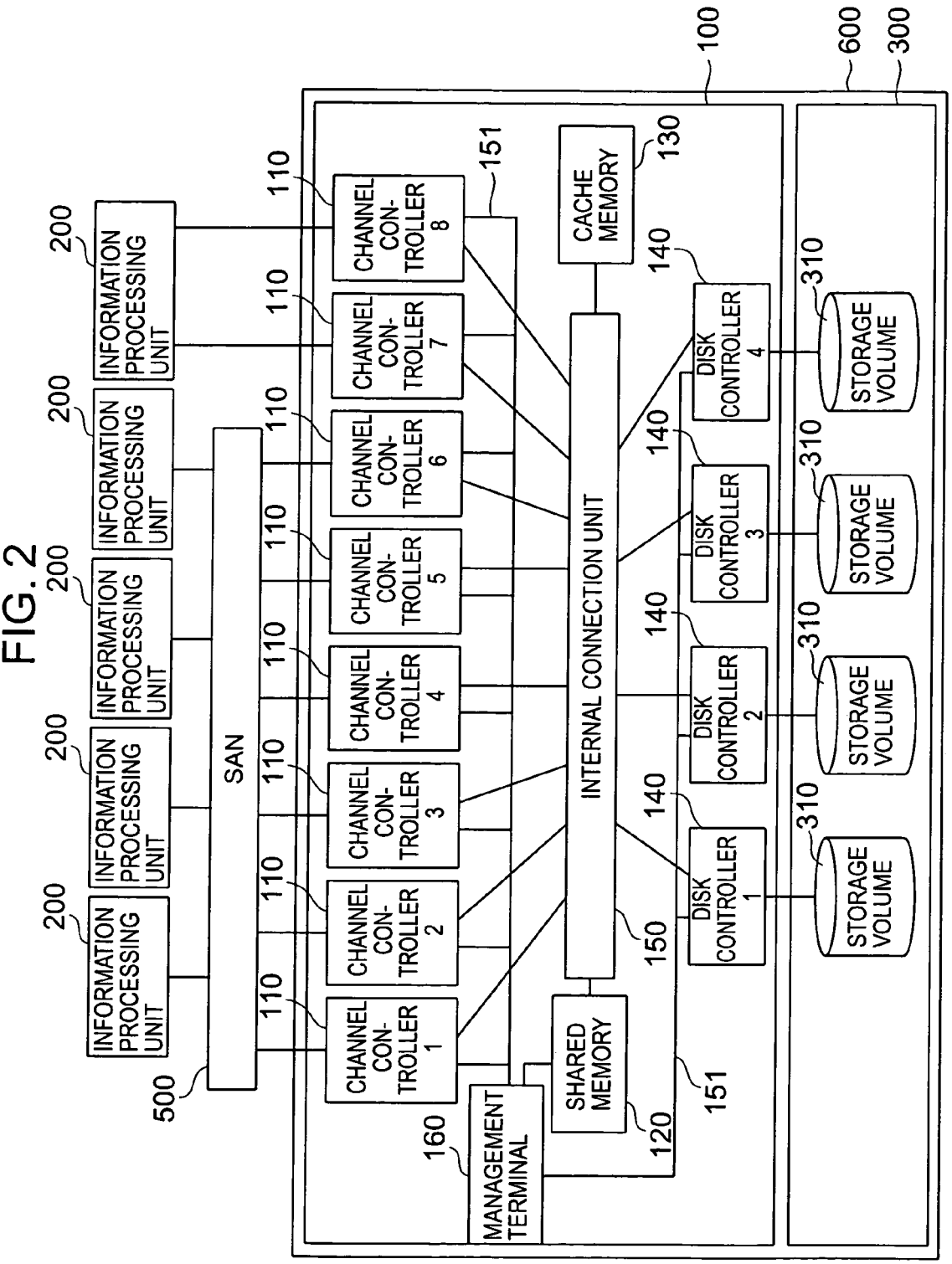
FIG. 2 is a block diagram showing the general configuration of a storage unit in the embodiment.

Next, FIG. 2 is a block diagram showing the storage unit 600 in this embodiment. FIG. 2 shows an example in which the storage units 600 is connected communicably to five information processing unit 200.

The storage unit 600 comprises a storage controller 100 and a storage driver 300. The storage controller 100 controls the storage driver 300 according to a command received, for example, from information processing units 1-5 (200). For example, the storage controller 100 receives a data input/output request from information processing units 1-5 (200) and reads data from, or writes data to, a storage volume 310 included in the storage driver 300. The storage volume 310, which refers to a storage area in which data is stored, includes a physical volume and a logical volume. The physical volume is a physical storage area provided on a physical disk drive such as a hard disk drive. The logical volume is a logical storage area logically allocated on a physical volume.

Referring to FIG. 2, information processing units 1-4 (200) are connected communicably to the storage controller 100 via the SAN 500. Information processing unit 5 (200) is connected to the storage controller 100 not via a network such as the SAN 500.

===Storage Driver===

The storage driver 300 comprises a plurality of hard disk drives on which data is stored. Those hard disk drives allow the storage unit 600 to provide a large storage area for information processing units 1-5 (200). Those hard disk drives can also be configured as a RAID (Redundant Arrays of Inexpensive Disks).

The storage controller 100 and the storage driver 300 may be connected directly, that is, not via a network, as shown in FIG. 1 or via a network. The storage driver 300 and the storage controller 100 can also be configured as an integrated unit.

===Storage Controller===

The storage controller 100 comprises channel controllers 110, a shared memory 120, a cache memory 130, disk controllers 140, a management terminal 160, and an internal connection unit 150.

The channel controller 110 has a communication interface for communication with the information processing unit 200 or other storage units 600. The channel controllers 110 and the management terminal 160 are connected via an internal LAN 151. This configuration allows the operator on the management terminal 160 to send and install a micro-program that is executed by the channel controller 110. The configuration of the channel controller 110 will be described later.

The internal connection unit 150 interconnects the channel controllers 110, shared memory 120, cache memory 130, and disk controllers 140. Data and commands are transferred among the channel controllers 110, shared memory 120, cache memory 130, and disk controllers 140 via the internal connection unit 150. The internal connection unit 150 is configured, for example, by a crossbar switch.

The shared memory 120 and the cache memory 130 are memories in which commands and data transferred between the channel controllers 110 and the disk controllers 140 are stored. The shared memory 120 is used primarily to store control information and commands while the cache memory 130 is used primarily to store data.

For example, when a data input/output request received by one of the channel controllers 110 from the information processing unit 200 is a data write request, the channel controller 110 writes the data write request in the shared memory 120 and, at the same time, writes the write data, received from the information processing unit 200, in the cache memory 130. On the other hand, the disk controller 140 monitors the shared memory 120 and, upon detecting that a data write request is written in the shared memory 120, reads the write data from the cache memory 130 according to the data write request and writes the data in the storage driver 300.

When a data input/output request received by one of the channel controllers 110 from the information processing unit 200 is a data read request, the channel controller 110 checks the cache memory 130 if it contains data to be read. If the data is in the cache memory 130, the channel controller 110 reads the data and sends it to the information processing unit 200. On the other hand, if the data to be read is not in the cache memory 130, the channel controller 110 writes a data read request in the shared memory 120 and, at the same time, monitors the shared memory 120. When the disk controller 140 detects that the data read request is written in the shared memory 120, the disk controller 140 reads the corresponding read data from the storage driver 300 and writes it in the cache memory 130 and, at the same time, writes information in the shared memory 120 to indicate that the data has been written into the cache memory 130. When the channel controller 110 detects that the data to be read is written in the cache memory 130, the channel controller 110 reads the data and sends it to the information processing unit 200.

As described above, data is transferred between the channel controller 110 and the disk controller 140 via the cache memory 130.

Other configurations are also possible. For example, a data write or read instruction may be sent from the channel controller 110 to the disk controller 140 indirectly via the shared memory 120, or a data write or read instruction may be sent directly from the channel controller 110 to the disk controller 140 not via the shared memory 120.

It is also possible to configure the channel controller 110 and the disk controller 140 as an integrated unit to provide a controller having both functions.

Figures 9, 10:
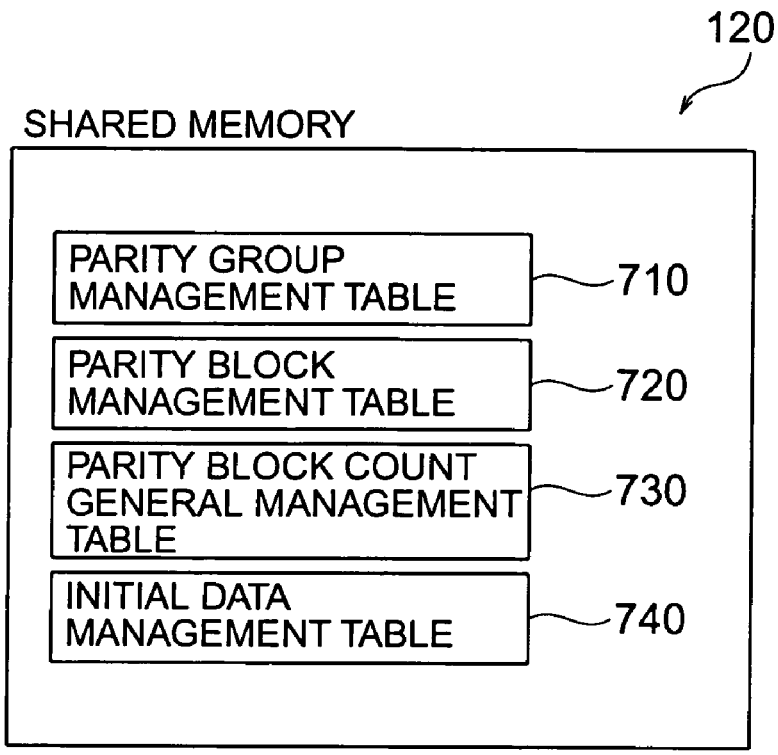
FIG. 9 is a diagram showing the tables stored in a shared memory in the embodiment.
FIG. 10 is a diagram showing a parity management table in the embodiment.

As shown in FIG. 9, the shared memory 120 in this embodiment stores a parity group management table 710, a parity block management table 720, a parity block count general management table 730, and an initial data management table 740. Those tables will be described later.

The disk controller 140, connected communicably to the storage driver 300, reads data from or writes data to the storage volume 310 on which data is stored. For example, the disk controller 140 reads data from or writes data to the storage volume 310 as described above according to a data input/output request received by the channel controller 110 from the information processing unit 200.

The disk controllers 140 and the management terminal 160 are connected to the internal LAN 151 for communication with each other. This configuration allows the operator on the management terminal 160 to send and install a micro-program that is executed by the disk controller 140. The configuration of the disk controller 140 will be described later.

Although the shared memory 120 and the cache memory 130 are provided independently of the channel controller 110 and the disk controller 140 in this embodiment in the above description, this embodiment is not limited to this configuration. For example, it is also preferable that the shared memory 120 or the cache memory 130 be distributed in each of the channel controller 110 and the disk controller 140. In this case, the internal connection unit 150 interconnects the channel controller 110 and the disk controller 140 having the distributed shared memory 120 or cache memory 130.

It is also possible to integrate one or more of the channel controllers 110, disk controllers 140, internal connection unit 150, shared memory 120, and cache memory 130.

===Management Terminal===

The management terminal 160 is an information apparatus for maintaining and managing the storage unit 600. The operator operates the management terminal 160 to set the configuration of the hard disk drives in the storage driver 300, set a path that is a communication path between the information processing unit 200 and the channel controller 110, set the storage volumes 310, and install micro-programs to be executed in the channel controller 110 or disk controller 140. Those settings and control can be performed through the user interface of the management terminal 160 or through the user interface of the information processing units 1-5 (200) that display a web page provided by a web server running on the management terminal 160.

The management terminal 160 may be built in the storage controller 100 or may be provided as an external unit. The management terminal 160 may be a computer dedicated to the maintenance and management of the storage unit 600 or a general-purpose computer that has the maintenance and management function.

Figure 5:
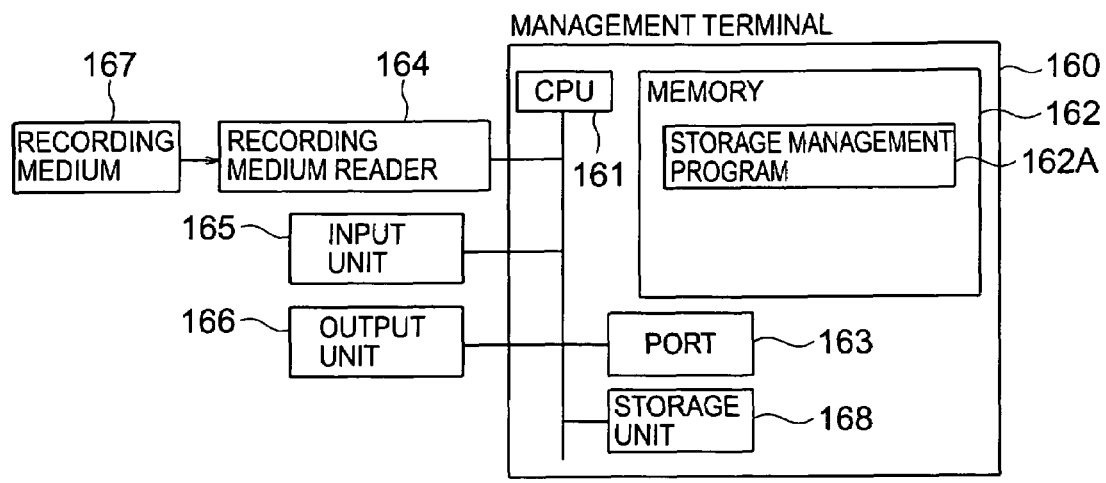
FIG. 5 is a block diagram showing the configuration of a management terminal in the embodiment.

FIG. 5 is a block diagram showing the configuration of the management terminal 160.

The management terminal 160 comprises a CPU 161, a memory 162, a port 163, a recording medium reader 164, an input unit 165, an output unit 166, and a storage device 168.

The CPU 161, which controls the whole of the management terminal 160, executes a storage management program 162A composed of code for performing various operations stored in the memory 162 to provide the maintenance and management function of the storage unit 600. Similarly, the CPU 161 executes the storage management program 162A to implement the function of the web server described above.

The recording medium reader 164 is a unit that reads programs and data stored on a recording medium 167. The programs and data that are read are stored in the memory 162 or the storage device 168. Therefore, the storage management program 162A recorded on the recording medium 167 can be read from the recording medium 167 via the recording medium reader 164 and stored in the memory 162 or the storage device 168. The recording medium 167 may be a flexible disk, a CD-ROM, or a semiconductor memory. The recording medium reader 164 may be built in the management terminal 160 or may be an external unit. The storage device 168 is a hard disk drive or a semiconductor storage unit. The input unit 165 is a user interface used by the operator to enter data into the management terminal 160. The input unit 165 is, for example, a keyboard or a mouse. The output unit 166 is a user interface used to output information to an external unit. The output unit 166 is, for example, a display or a printer. The port 163, connected to the internal LAN 151, allows the management terminal 160 to communicate with the channel controllers 110 or the disk controllers 140. The port 163 may also be connected communicably, for example, with the LAN 400. In this case, the management terminal 160 can communicate with information processing units 1-5 (200) via the LAN 400.

===External View===

Figure 3:
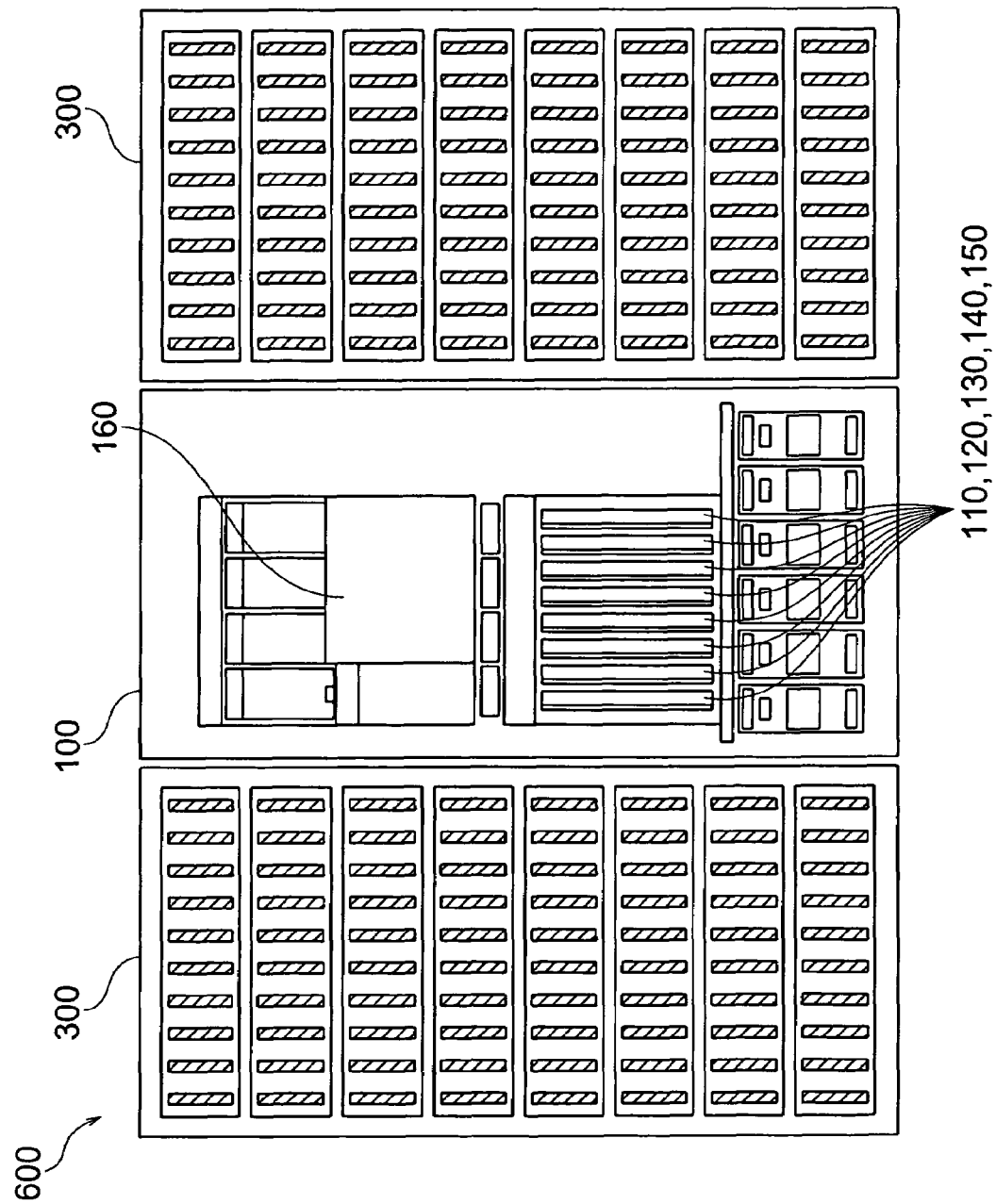
FIG. 3 is a diagram showing the external configuration of the storage unit in the embodiment.
Figure 4:
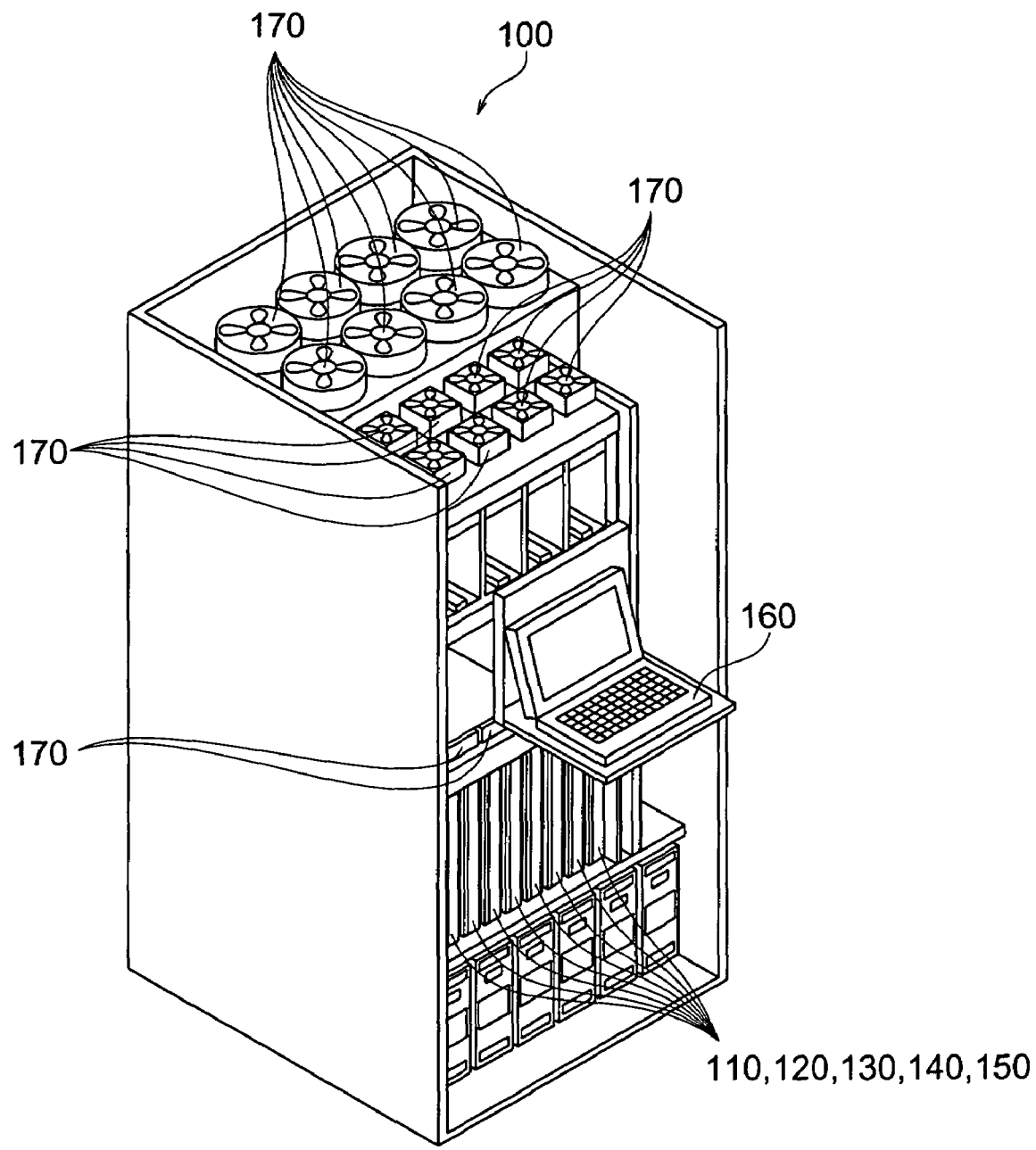
FIG. 4 is a diagram showing the external configuration of a storage controller in the embodiment.

Next, FIG. 3 shows the external configuration of the storage unit 600 in this embodiment. FIG. 4 shows the external configuration of the storage controller 100.

As shown in FIG. 3, the storage unit 600 in this embodiment has the storage controller 100 and the storage driver 300 each installed in a cabinet. In the example shown in FIG. 3, the cabinets of the storage drivers 300 are provided on both sides of the storage controller 100.

The storage controller 100 has the management terminal 160 in the central part of the front. The management terminal 160, which has a cover, can be used by opening the cover as shown in FIG. 4. The management terminal 160 shown in FIG. 4, which is a so-called notebook personal computer, may have any configuration.

Below the management terminal 160 are provided slots in which the channel controllers 110, disk controllers 140, cache memory 130, shared memory 120 and internal connection unit 150 are installed. The channel controller 110, disk controller 140, cache memory 130, shared memory 120, and internal connection unit 150, each configured as a circuit board, are installed in the slots. Each slot has guide rails along which a board is installed. The channel controllers 110, disk controllers 140, cache memory 130, shared memory 120, and internal connection unit 150 are inserted into the slots along the guide rails for installation into the storage controller 100. A connector is provided at the end of each slot for electrically connecting the board with the storage controller 100.

The storage controller 100 also has fans 170 for radiating heat generated by the channel controllers 110 and so on. The fans 170 are provided on the top of the storage controller 100 as well as above the slots.

===Channel Controller===

Figure 6:
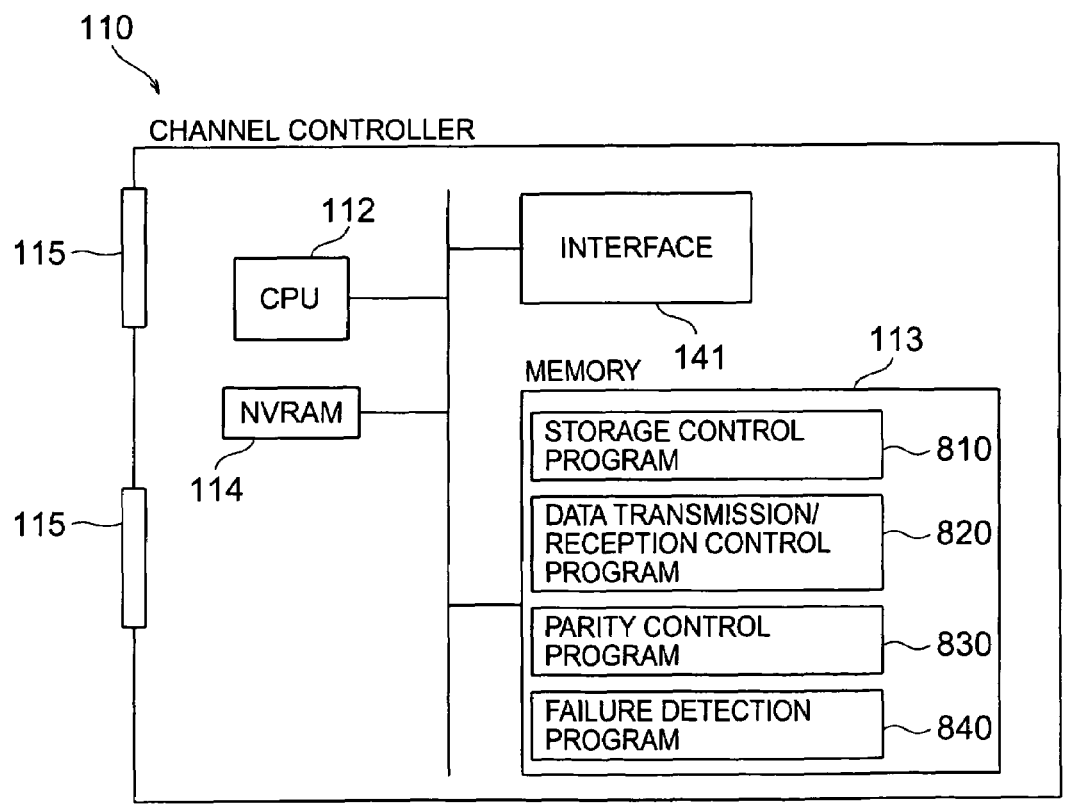
FIG. 6 is a block diagram showing the configuration of a channel controller in the embodiment.

FIG. 6 shows the configuration of the channel controller 110.

The channel controller 110 is configured as a one-unit board having the circuit thereon. The channel controller 110 is composed of one or more circuit boards. The circuit board has an interface 111, a memory 113, a CPU 112, an NVRAM (nonvolatile random-access memory) 114, and a connector 115.

The interface 111 comprises a communication interface for communication with the information processing unit 200 and the other storage unit 600; and a communication interface for communication among the shared memory 120, the cache memory 130, and the channel controller 110 via the internal connection unit 150.

The CPU 112 controls the whole of the channel controller 110. The CPU 112 executes various programs stored in the memory 113 and the NVRAM 114 to implement the function of the channel controller 110 in this embodiment.

The NVRAM 114 is a non-volatile memory in which the programs controlling the CPU 112 are stored. The contents of the programs stored in the NVRAM 114 may be written or rewritten by an instruction from the management terminal 160.

The channel controller 110 has the connectors 115. The connectors 115 engage with the connectors in the storage controller 100 to electrically connect the channel controller 110 to the internal connection unit 150 and the management terminal 160 of the storage controller 100.

The memory 113 contains a storage control program 810, a data transmission/reception control program 820, a parity control program 830, and a failure detection program 840.

The storage control program 810 is a program that controls the input/output of data stored in the storage volume 310 and controls the settings of the storage unit 600. For example, a parity group management table 710, a parity block management table 720, the parity block count general management table 730, and the initial data management table 740, all of which will be described later, are created and updated by the storage control program 810 executed by the CPU 112. First to fourth storage controllers and first to fifth data storage controllers are implemented, for example, by the storage control program 810 which is executed by the CPU 112 in the channel controller 110 and which works with the disk controller 140, shared memory 120, cache memory 130, and storage driver 300.

The data transmission/reception control program 820 is a program that controls data transmission and reception to or from the other storage unit 600 and the information processing unit 200. Therefore, first to sixth reception units, first to second transmission units, first to seventh data reception units, and first to eighth data transmission units are implemented, for example, by executing the data transmission/reception control program 820 in the CPU 112.

The parity control program 830 is a program that performs the exclusive OR operation. For example, the program calculates the exclusive OR of the data received from multiple other storage units 600, the exclusive OR of the data stored in the storage volume 310 and the data received from the information processing unit 200, and the exclusive OR of the data stored in the storage volume 310 and the data received from other storage units 600. Therefore, first to fifth operation controllers and first to seventh data operation controllers are implemented, for example, by executing the parity control program 830 in the CPU 112.

The failure detection program 840 is a program that detects a failure generated in the storage unit 600. For example, the program detects if the data stored in the storage volume 310 is normal.

When one of storage units 1-3 (600) in FIG. 1, for example, storage unit 1 (600), detects an error in the data stored in the storage volume 310, storage unit 1 (600) sends to storage unit 4 (600) a request to send the original data. In response to this request, storage unit 4 (600) sends a request to send data, which is stored in the storage unit 600, to the storage units 600 other than storage unit 1 (600), that is, storage unit 2 (600) to storage unit 3 (600). Storage unit 4 (600) then calculates the exclusive OR of the data stored in storage units 2-4 (600), restores the original data that was stored in the storage unit 1 (600), and sends the restored data to storage unit 1 (600).

On the other hand, when storage unit 4 (600) in FIG. 1 detects an error in the data stored in the storage volume 310, storage unit 4 (600) sends to storage units 1-3 (600) a request to send data stored in their storage units 600. Storage unit 4 (600) then calculates the exclusive OR of the data stored in storage units 1-3 (600) to restore the original data that was stored in the storage unit 4 (600).

The storage control program 810, the data transmission/reception control program 820, the parity control program 830, and the failure detection program 840 are separate programs or at least a part of those programs may be prepared by the same program. Each program may also be created by a plurality of programs.

===Disk Controller===

Figure 7:
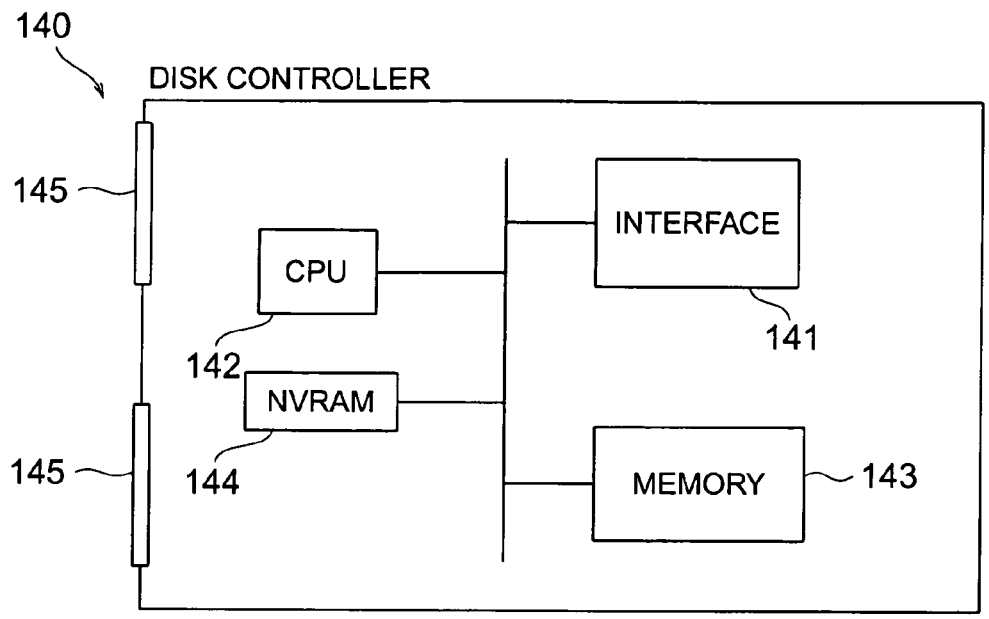
FIG. 7 is a block diagram showing the configuration of a disk controller in the embodiment.

Next, FIG. 7 shows the configuration of the disk controller 140.

The disk controller 140 is a one-unit board having a circuit thereon. The disk controller 140 is composed of one or more circuit boards. The circuit board has an interface 141, a memory 143, a CPU 142, an NVRAM 144, and connectors 145.

The interface 141 comprises a communication interface for communication with the channel controller 110 and so on via the internal connection unit 150; and a communication interface for communication with the storage driver 300.

The CPU 142 controls the whole of the disk controller 140. The CPU 142 executes various programs stored in the memory 143 and the NVRAM 144 to implement the function of the disk controller 140 in this embodiment.

The NVRAM 144 is a non-volatile memory in which the programs controlling the CPU 142 are stored. The contents of the programs stored in the NVRAM 144 may be written or rewritten by an instruction from the management terminal 160.

The disk controller 140 has the connectors 145. The connectors 145 engage with the connectors in the storage controller 100 to electrically connect the disk controller 140 to the internal connection unit 150, the storage driver 300, and the management terminal 160 of the storage controller 100.

The above-described parity control program 830 and the failure detection program 840 executed in the channel controller 110 described above may also be stored in the memory 143 of the disk controller 140. In this case, the CPU 142 executes the parity control program 830 and the failure detection program 840 to allow the disk controller 140 to perform the exclusive OR operation described above or to detect a failure generated in the storage unit 600.

===Information Processing Unit===

Figure 8:
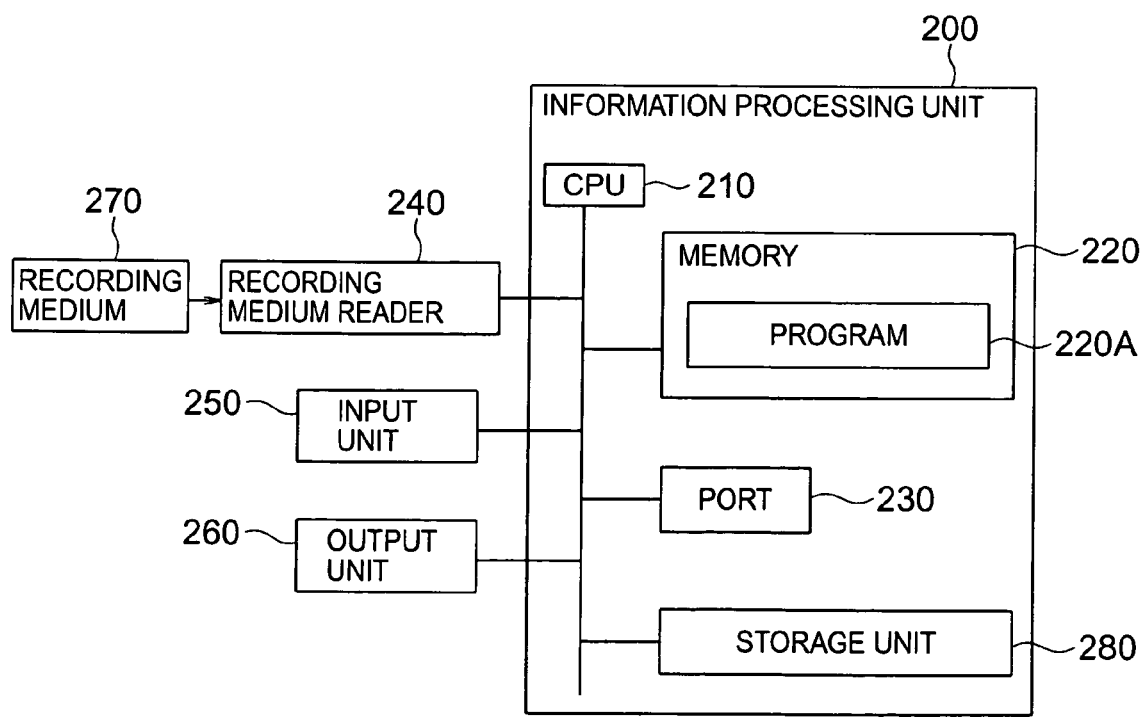
FIG. 8 is a block diagram showing the configuration of an information processing unit in the embodiment.

FIG. 8 is a block diagram showing the configuration of the information processing unit 200 in this embodiment.

The information processing unit 200 comprises a CPU 210, a memory 220, a port 230, a recording medium reader 240, an input unit 250, an output unit 260, and a storage device 280.

The CPU 210, which controls the whole of the information processing unit 200, executes a program 220A composed of code for various operations stored in the memory 220 to implement the various functions in this embodiment. For example, the CPU 210 executes the program 220A to provide the information processing service, such as the automated teller service in a bank described above. In addition, the CPU 210 executes the program 220A to display a web page provided by the web server running in the management terminal 160 described above, to change the configuration of the hard disk drives, to set a path which is a communication path between the information processing unit 200 and the channel controller 110, and to set the storage volumes 310. The recording medium reader 240 is a unit for reading programs and data recorded on a recording medium 270. The programs and data that are read are stored in the memory 220 or the storage device 280. Therefore, the program 220A recorded on the recording medium 270 can be read, for example, from the recording medium 270 via the recording medium reader 240 for storing it in the memory 220 or the storage device 280.

The recording medium 270 may be a flexible disk, a CD-ROM, or a semiconductor memory. The recording medium reader 240 may be built in the information processing unit 200 or may be an external unit.

The storage device 280 may be a unit such as a hard disk drive or a semiconductor device. The storage device 280 may be built in the information processing unit 200 or may be an external device. When the storage device 280 is an external device may, it may also be the storage device 280 of some other information processing unit 200 connected via a communication network. The external device may also be the storage unit 600. The input unit 250 is a user interface used by the operator of the information processing unit 200 to enter data into the information processing unit 200. The input unit 250 is, for example, a keyboard or a mouse. The output unit 260 is a user interface for outputting information to an external device. The output unit 260 is, for example, a display or a printer. The port 230 is a unit required for communicating with the channel controller 110. The port 230 may also be configured so that the information processing unit 200 can communicate with another information processing units 200 or the management terminal 160 via a communication network such as the LAN 400. In this case, for example, the program 220A may be received from another information processing unit 200 via the port 230 and stored in the memory 220 or storage device 280.

===Creation of Backup Data===

As described above, data for backing up data stored in storage units 1-3 (referred to as data storage units, other storage units, or first storage units) (600) is stored in storage unit 4 (600) (referred to as parity storage unit or second storage unit) in this embodiment. First, the processing flow of storing data, which is the backup data of storage units 1-3 (600), into storage unit 4 (600) will be described with reference to FIGS. 14 to 26.

Data for backing up data, stored in the data storage units 600, is stored in the parity storage unit 600 in one of two methods: synchronous method and asynchronous method.

The synchronous method refers to the method in which the exclusive OR operation is performed using data stored in all data storage units 600, connected communicably to the parity storage unit 600, and the parity data that is the operation result is stored in the parity storage unit 600. Therefore, when the data storage unit 600 connected communicably to the parity storage unit 600 is added, the exclusive OR operation is performed again in the synchronous system using the data stored in all data storage units 600, including the added storage unit 600, and the result is stored in the parity storage unit 600.

This is represented by an expression as follows. That is, assume that storage unit 3 (600) is added as a data storage unit when there are two data storage units 600, for example, storage unit 1 (600) and storage unit 2 (600). In this case, when storage unit 3 (600) is added, data stored in the parity storage unit 600 is created by calculating D1(EXOR)D2 (EXOR)D3, where D1 is data stored in storage unit 1 (600), D2 is data stored in storage unit 2 (600), and D3 is data stored in storage unit 3 (600).

On the other hand, the asynchronous method refers to the method in which, when the data storage unit 600 connected communicably to the parity storage unit 600 is added, the exclusive OR operation is performed, using the data already stored in the parity storage unit 600 and the data stored in the added storage unit 600, and the operation result is stored in the parity storage unit 600.

Similarly, this is represented by an expression as follow. Let D4 be data stored in the parity storage unit 600 before storage unit 3 (600) is added. When storage unit 3 (600) is added, D4(EXOR)D3 is calculated to create data to be stored on the parity storage unit 600.

Figure 14:
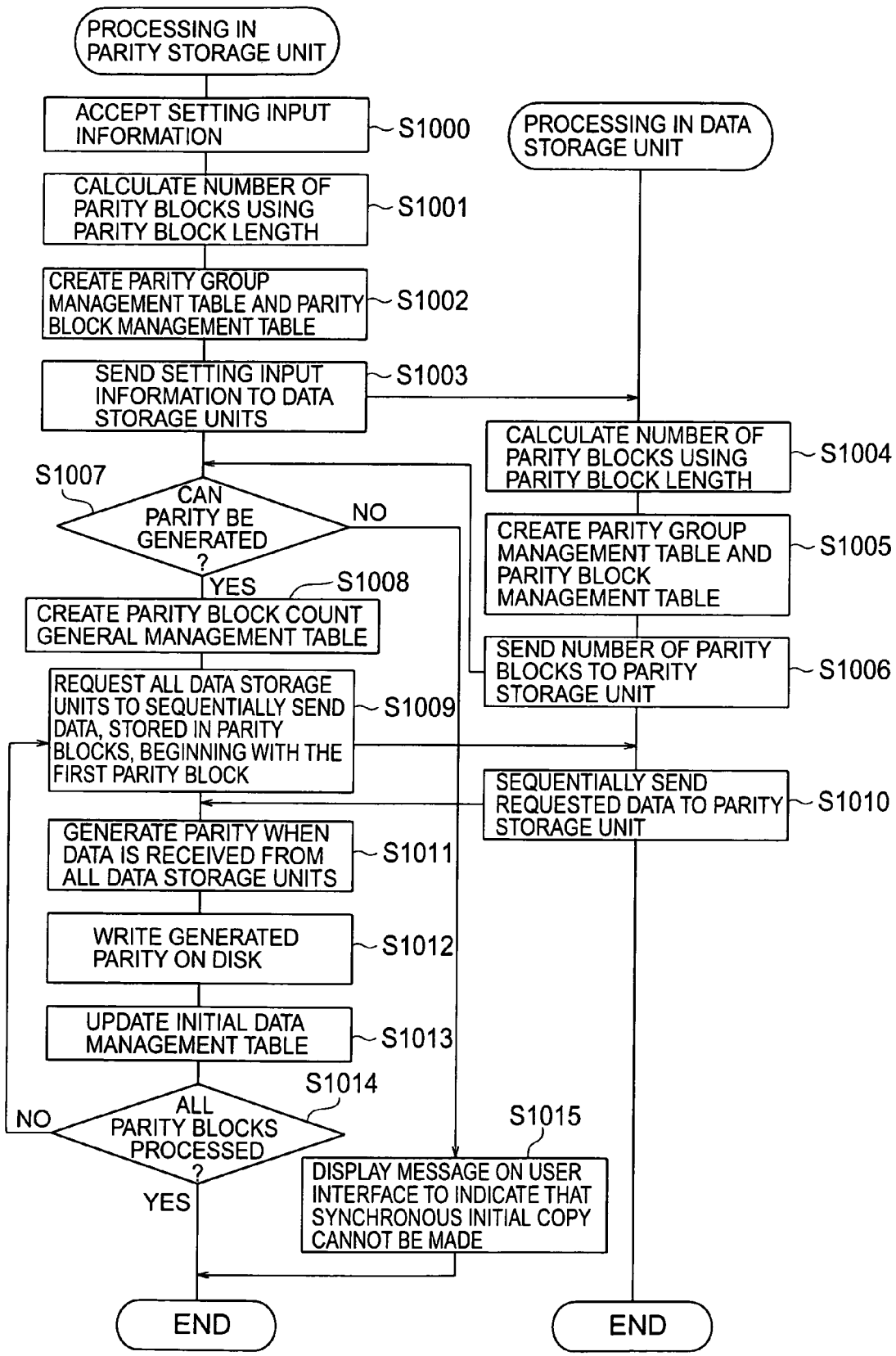
FIG. 14 is a flowchart showing the processing flow of the storage unit in the embodiment.

First, FIG. 14 shows the processing flow of the synchronous method where the processing in the parity storage unit 600 and the processing in the data storage units 600 are shown separately.

Figure 15:
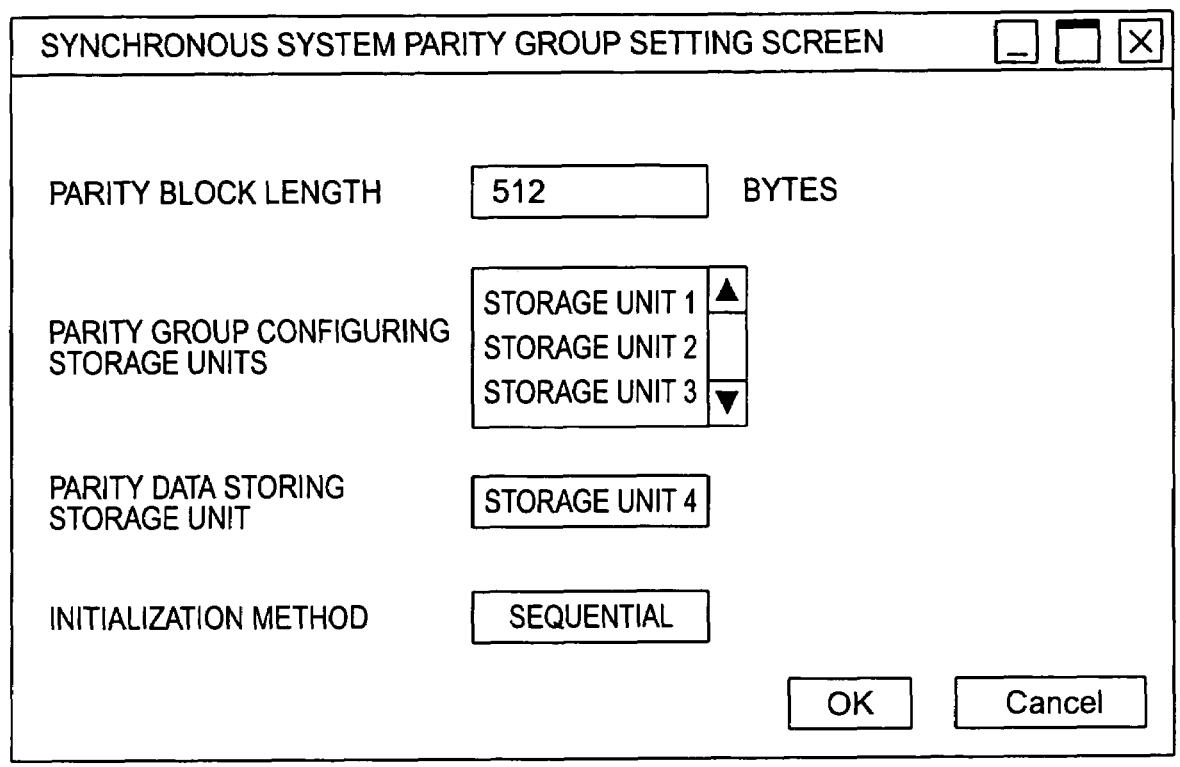
FIG. 15 is a diagram showing an example of a setting screen in the embodiment.

First, the parity storage unit 600 accepts setting input information (S1000). To accept the setting input information, the window screen such as the one shown in FIG. 15 is displayed on the output unit 166, provided on the management terminal 160, to accept an input from the operator via the output unit 166. The setting contents accepted from the operator are, for example, "parity block length", "parity group configuring storage units", "parity data storing storage unit", and "initialization method".

The "parity block length" field is used to define the parity block length. A parity block refers to a storage area (storage block) created by logically partitioning the data storage area on the hard disk drives provided in the storage unit 600. The parity block length is the size of a parity block. FIG. 15 shows an example in which the parity block length is 512 bytes. Each parity block is identified by an identifier (parity block number) uniquely assigned in the storage unit 600.

The "parity group configuring storage units" field is used to define the storage units 600 used as the data storage units 600. FIG. 15 shows an example in which storage units 1-3 (600) are defined as the data storage units 600.

The "parity data storing storage unit" field is used to define the storage unit 600 to be configured as the parity storage unit 600 in which data, used to back up data stored in the data storage units 600, is stored. FIG. 15 shows an example in which storage unit 4 (600) is defined as the parity storage unit 600.

The "initialization method" field is used to define how to send data from the data storage units 600 to the parity storage unit 600. There are two "initialization methods": "sequential method" and "random method". In the "sequential method", data is sent from the parity blocks of the data storage units 600 to the parity storage unit 600 in order of parity block numbers. In the "random method", when the data storage unit 600 receives a data write request from the information processing unit 200, the data stored in the parity block to which the data write request is issued and the write data specified by the data write request are exclusively ORed and the result is sent to parity storage unit 600. In the "random method", it is also possible to send the data stored in the parity block, to which a data read request is issued, to the parity storage unit 600 when the data storage unit 600 receives the data read request from the information processing unit 200.

When the operator clicks the "OK" button on the screen in FIG. 15 using the mouse, the setting input information is sent to the storage unit 600.

Then, the parity storage unit 600 calculates the number of parity blocks using the parity block length (S1001). More specifically, the storage amount of the storage area of the parity storage unit 600 is divided by the parity block length to calculate the number of parity blocks.

After that, the parity storage unit 600 creates the parity group management table 710 and the parity block management table 720 (S1002). FIG. 10 shows the parity group management table 710, and FIG. 11 shows the parity block management table 720.

The parity group management table 710 is composed of the "data storing storage unit" field and the "parity storing storage unit" field. The "data storing storage unit" field contains the data storage units 600. The "parity storing storage unit" field contains the parity storage unit 600. As described above, the parity group management table 710 is stored in the shared memory 120.

On the other hand, the parity block management table 720 is composed of the "parity block length" field, the "number of parity blocks" field, and the "logical volume number" field. The "parity block length" field contains the parity block length. The "number of parity blocks" field contains the number of parity blocks. The "logical volume number" field contains the first parity block number of the storage area of each logical volume of the storage unit 600. As described above, the parity block management table 720 is also stored in the shared memory 120.

After that, the parity storage unit 600 sends the setting input information to the data storage units 600 (S1003).

Then, each data storage unit 600 calculates the number of parity blocks using the parity block length sent from the parity storage unit 600 (S1004) and, as with the parity storage unit 600, creates the parity group management table 710 and the parity block management table 720 (S1005).

In this way, by logically partitioning the storage area of the parity storage unit 600 and that of the data storage units 600 according to the parity data length, a correspondence is established between the storage areas of both types of storage units 600 on a parity block basis. For example, for the same parity block number, there is a correspondence between the parity blocks of the parity storage unit 600 and those of the data storage units 600. FIGS. 16A-16C show this correspondence. FIGS. 16A-16C show that the parity block of the parity storage unit 600 and that of the data storage units 600 can be identified by specifying a parity block number (parity block number 12356).

The correspondence, if established as described above, allows data on the data storage units 600 to be backed up even when the storage system is configured by storage units 600 using storage volumes 310 controlled by different control methods.

The control methods of the storage volume 310 are, for example, the CKD (Count Key Data) method usually used in a mainframe information processing system and the FBA (Fixed Block Architecture) method usually used in an open information processing system.

Next, each data storage unit 600 sends the number of parity blocks calculated in S1004 to the parity storage unit 600 (S1006).

Upon receiving the number of parity blocks from each data storage unit 600, the parity storage unit 600 compares it with the number of parity blocks calculated in S1001 to check if the parity can be generated (S1007). If the number of parity blocks received from the data storage unit 600 is larger than the number of parity blocks calculated in S1001, control is passed to "No" in S1007, a message is sent to the output unit 166 of the management terminal 160 to indicate that the synchronous initial copy cannot be made, and the processing is terminated (S1015). This is because, out of the data in the parity blocks of the data storage unit 600, the parity storage unit 600 cannot store the backup data of a parity block of the data storage unit 600 into a parity block of the parity storage unit 600 identified by a parity block number (parity block identifier) larger than the maximum parity block number of the parity storage unit 600.

If the number of parity blocks received from the data storage unit 600 is not larger than the number of parity blocks calculated in S1001, the parity storage unit 600 passes control to "Yes" in S1007 to create the parity block count general management table 730 (S1008). FIG. 12 shows the parity block count general management table 730. As shown in FIG. 12, the parity block count general management table 730 stores the number of parity blocks of the storage units 600. FIGS. 17A, 17B, 17C, and 17D show how the parity storage unit 600 checks if the parity can be generated in S1007.

Next, the parity storage unit 600 sends a request to the data storage units 600 to request it to sequentially send the data, stored in the parity blocks, in order of parity block numbers beginning with the first parity block (S1009). In response to this request, each data storage unit 600 sequentially sends a copy of data (first storage data), stored in the parity blocks, as well as the parity block numbers (first identifier), beginning with the first parity block (S1010).

Figure 33:
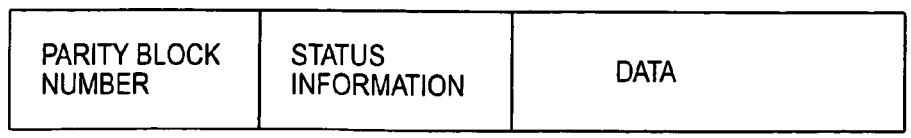
FIG. 33 is a diagram showing an example of a data transfer format among the storage units in the embodiment.

FIG. 33 shows the format of data transferred among the storage units 600. The data format comprises the "parity block number" field, "status information" field, and "data" field. The "parity block number" field contains the parity block number of the data to be transferred. The "status information" field contains various types of control information. For example, the status information includes information indicating the data destination storage unit 600, information indicating the data source storage unit 600, information indicating that the data sent by this data format is used to create parity data, information indicating that the data has been updated by the information processing unit 200 that will be described later, and the length of the data stored in the "data" field, that is, the parity block length. The "data" field contains data to be transferred.

The parity storage unit 600 receives a copy of data stored in the parity blocks of each data storage unit 600 as well as the parity block numbers (first identifier) identifying the parity blocks. Then, from the copies of data of the parity blocks received from the data storage units 600, the parity storage unit 600 calculates the exclusive OR of the copies of data with the same parity block number (S1011). After that, the parity storage unit 600 stores the calculation result of the exclusive OR into a parity block whose parity block number (second identifier), which identifies a parity block of the parity storage unit 600, equals the parity block number received from the data storage units 600 (S1012).

Then, the parity storage unit 600 updates the initial data management table 740 (S1013). The initial data management table 740 is a table indicating the progress of backup of data stored in the data storage units 600. FIGS. 13A-13C show examples of the initial data management table 740. FIG. 13A shows an example indicating the progress of backup of data stored in the data storage units 600, one row for each data storage unit 600.

That is, "OFF" in the "Recalculation in process" column indicates that the calculation for data backup, that is, the exclusive OR calculation, has already been completed for the data storage unit 600. "ON" in the "Recalculation in process" column indicates that the calculation for data backup, that is, the exclusive OR calculation, has not yet been completed for the data storage unit 600. For the backup data created in the synchronous method, the "Recalculation in process" column in the initial data management table 740 shown in FIG. 13A is either "ON" for all data storage units 600 or "OFF" for all data storage units 600. FIG. 13B shows an example when data is sent in the sequential method for calculating the exclusive OR; in this example, the "Recalculation position" column is provided for the data storage unit 600 whose "Recalculation in process" column contains "ON" to indicate to which parity block the exclusive OR calculation has been completed. FIG. 13C shows an example when data is sent in the random method for calculating the exclusive OR; in this example, the "Recalculation completed" column is provided for the data storage units 600 whose "Recalculation in process" column contains "ON" to indicate to which parity block of the data storage unit 600 the exclusive OR calculation has been completed. Any one of the tables shown in FIGS. 13A, 13B, and 13C may be used, as necessary, as the initial data management table 740.

Figure 18A:
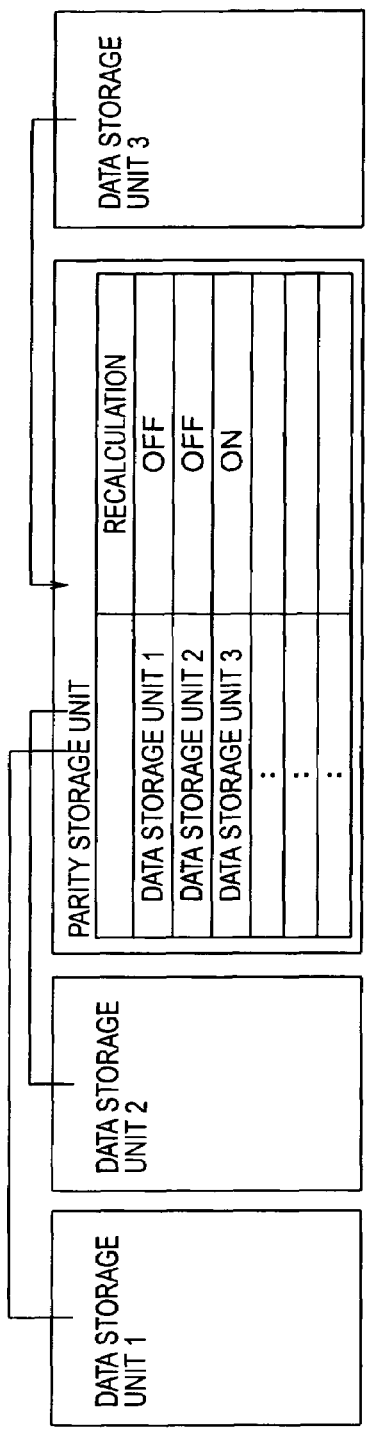
FIGS. 18A, 18B, and 18C are diagrams showing the contents of processing in the storage unit in the embodiment.
Figure 18B:
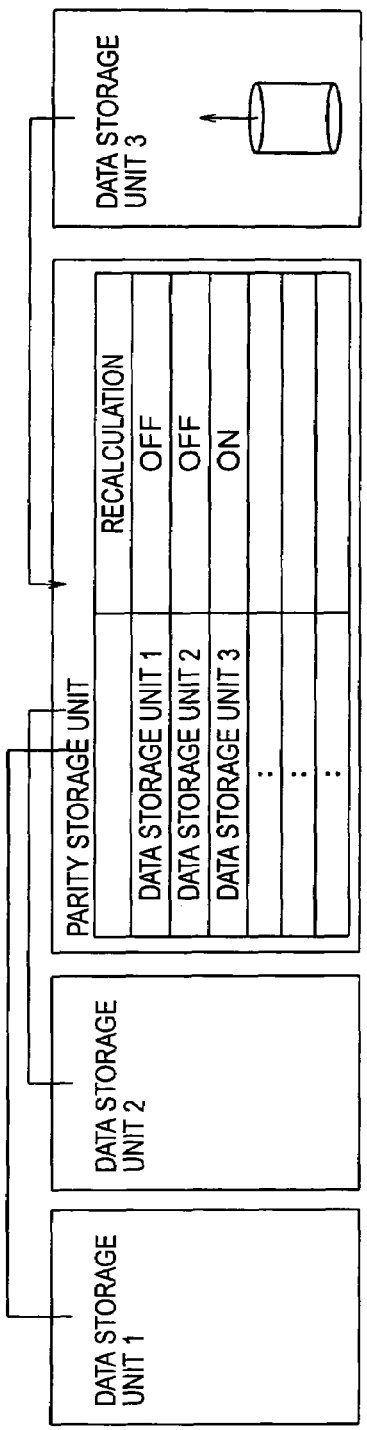
Figure 18C:
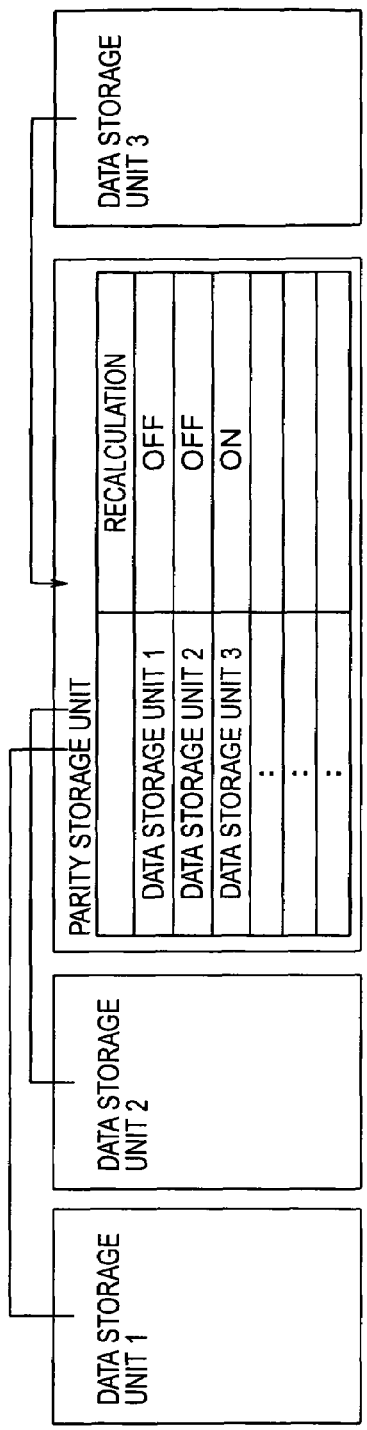
Figure 19A:
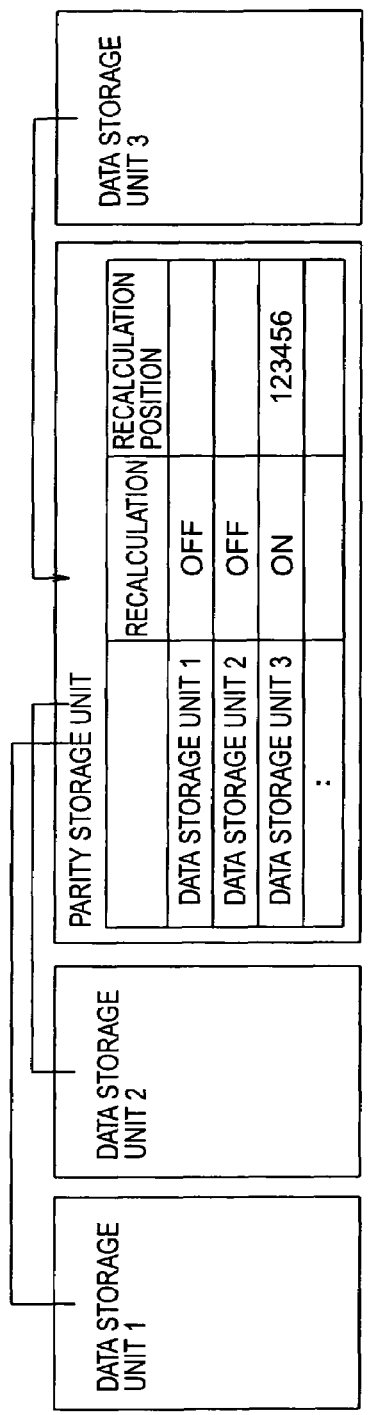
FIGS. 19A, 19B, and 19C are diagrams showing the contents of processing in the storage unit in the embodiment.
Figure 19B:
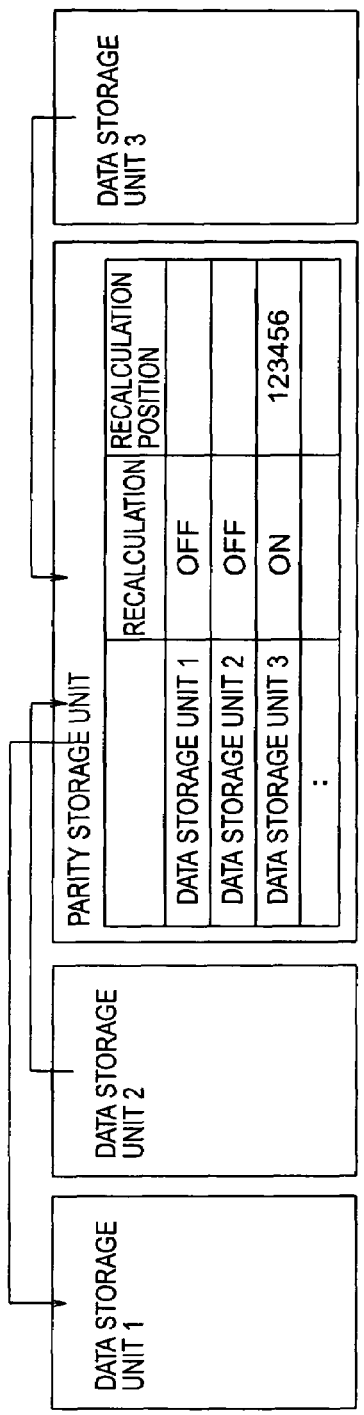
Figure 19C:
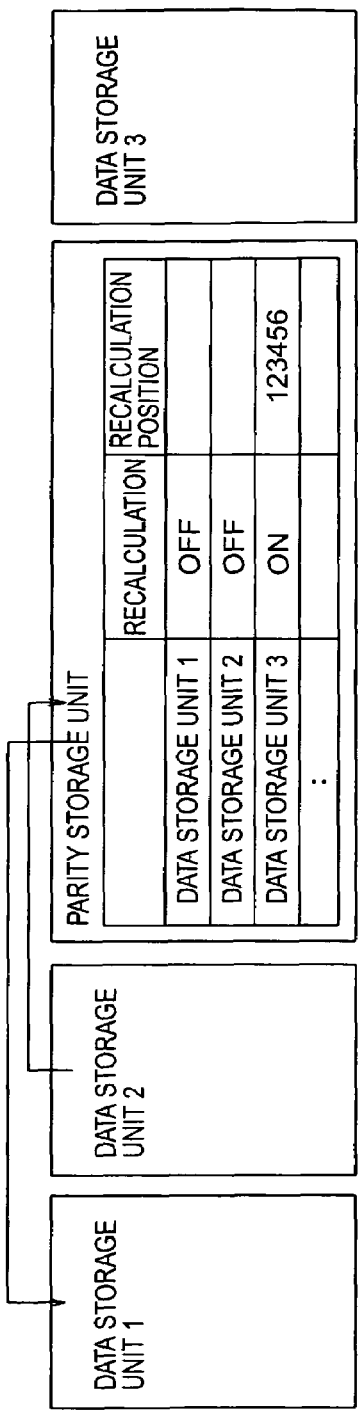
Figure 20A:
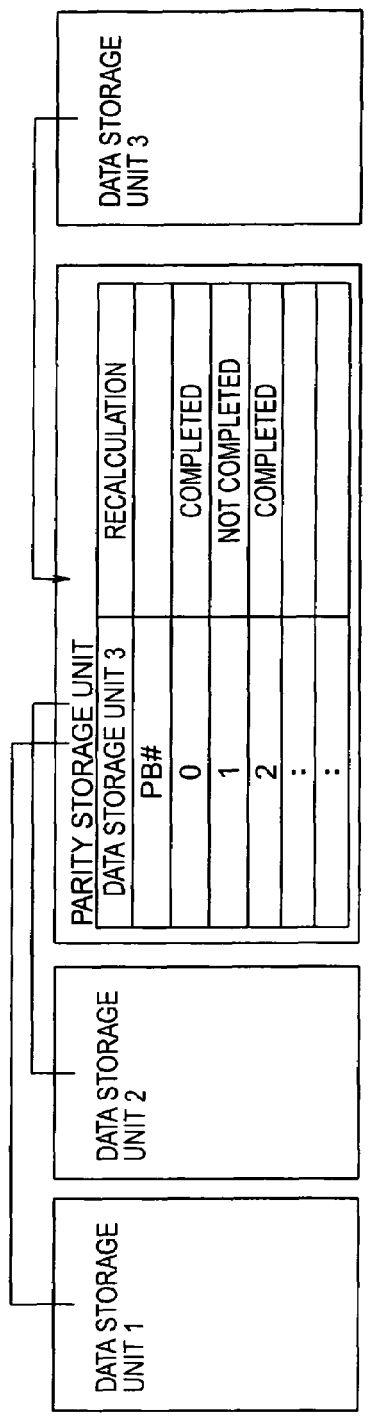
FIGS. 20A, 20B, and 20C are diagrams showing the contents of processing in the storage unit in the embodiment.
Figure 20B:
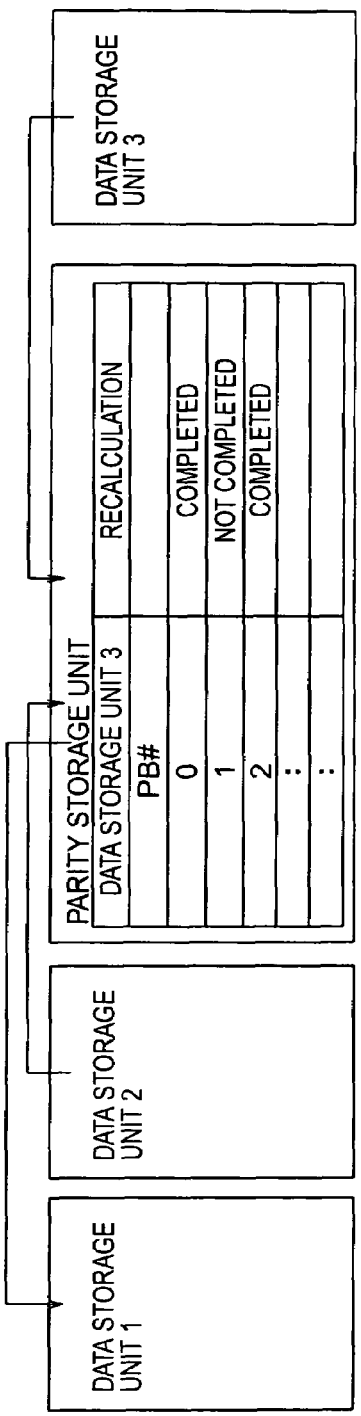
Figure 20C:
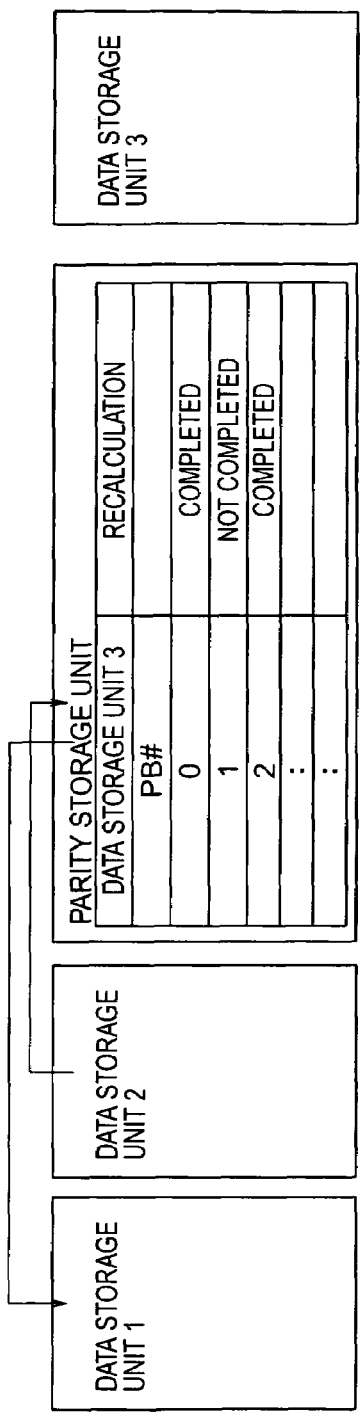

FIGS. 18A, 18B, and 18C show how the initial data management table 740 is updated when the table in FIG. 13A is used. FIG. 19 shows how the initial data management table 740 is updated when the table in FIG. 13B is used. FIGS. 20A, 20B, and 20C show how the initial data management table 740 is updated when the table in FIG. 13C is used.

Finally, the parity storage unit 600 references the initial data management table 740 to check if the calculation result of the exclusive OR is stored for all parity blocks (S1014) and, if so ("YES"), terminates processing.

Figure 21:
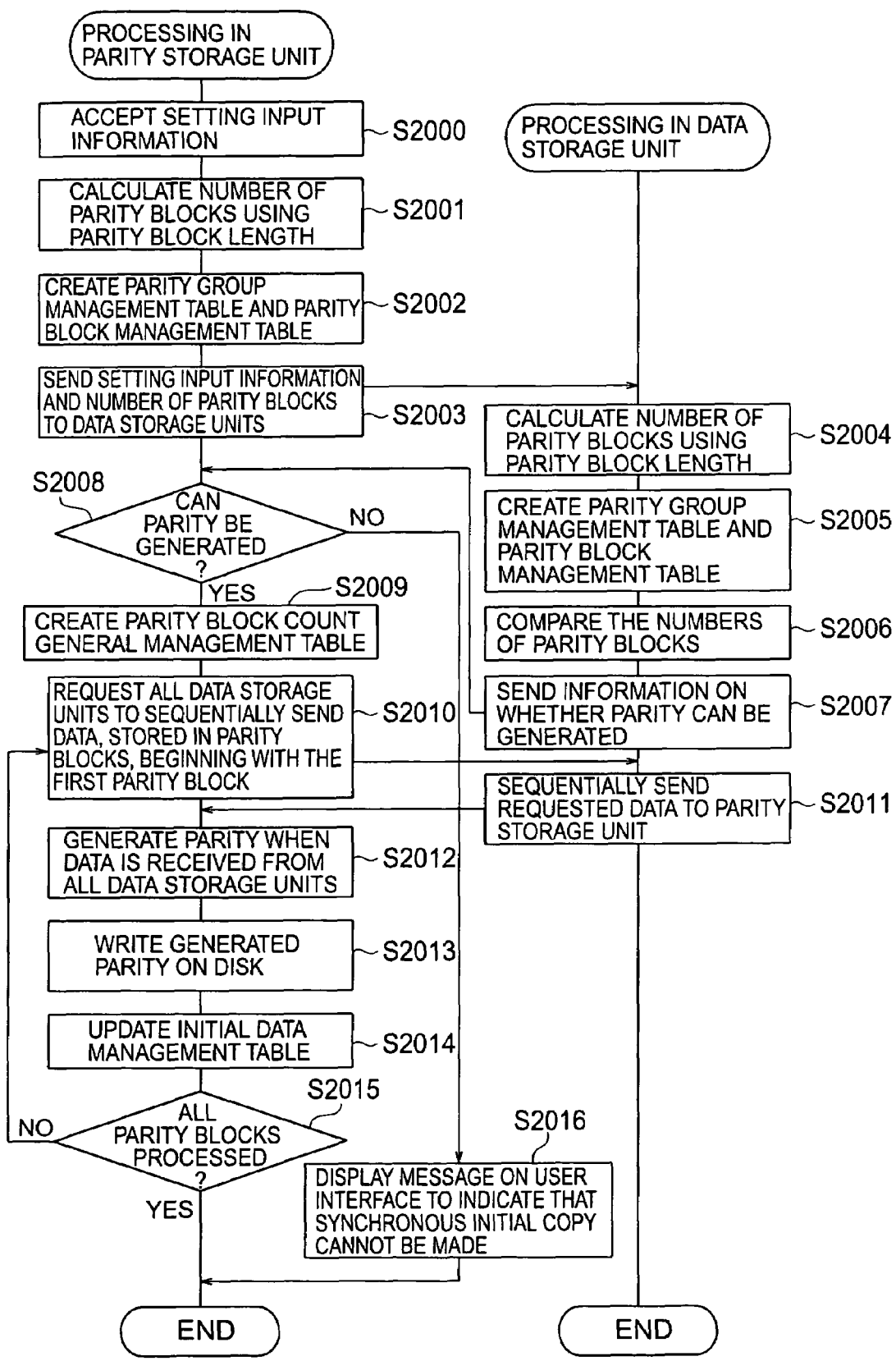
FIG. 21 is a flowchart showing the processing flow in the storage unit in the embodiment.

By performing the processing described above, the calculation results of the exclusive OR of the data in the parity blocks of the data storage units 600 are stored in the parity blocks of the parity storage unit 600. Although the parity storage unit 600 checks if the parity can be generated in this example (S1007), the data storage units 600 can also check if the parity can be generated. FIG. 21 shows the flow of that processing.

First, the parity storage unit 600 accepts setting input information (S2000).

Then, the parity storage unit 600 uses the parity block length to calculate the number of parity blocks (S2001).

The parity storage unit 600 creates the parity group management table 710 and the parity block management table 720 (S2002).

After that, the parity storage unit 600 sends the setting input information and the number of parity blocks calculated in S2001 to the data storage units 600 (S2003).

Then, each data storage unit 600 uses the parity block length, sent from the parity storage unit 600, to calculate the number of parity blocks (S2004) and creates the parity group management table 710 and the parity block management table 720 (S2005).

Each of the data storage units 600 compares the number of parity blocks, sent from the parity storage unit 600, with the number of parity blocks calculated in S2004 (S2006) to check if the parity can be generated. If the number of parity blocks sent from the parity storage unit 600 is larger than the number of parity blocks calculated in S2004, the data storage unit 600 judges that the parity can be generated; conversely, if the number of parity blocks sent from the parity storage unit 600 is smaller than the number of parity blocks calculated in S2004, the data storage unit 600 judges that the parity cannot be generated. The data storage unit 600 sends the judgment result to the parity storage unit 600 (S2007).

The parity storage unit 600 receives the judgment results, each indicating if the parity can be generated, from the data storage units 600 and, if at least one judgment result indicates that the parity cannot be generated, passes control to "No" in S2008. The parity storage unit 600 displays a message on the output unit 166 of the management terminal 160 to indicate that the synchronous initial copy cannot be made and terminates processing (S2016). On the other hand, if the judgment results from all data storage units indicate that the parity can be generated, the parity storage unit 600 passes control to "Yes" and creates the parity block count general management table 730 (S2009).

Next, the parity storage unit 600 sends a request to the data storage units 600 to request it to sequentially send the data, stored in the parity blocks, in order of parity block numbers beginning with the first parity block (S2010). In response to this request, each data storage unit 600 sequentially sends a copy of data, stored in the parity blocks, as well as the parity block numbers, beginning with the first parity block (S2011).

The parity storage unit 600 receives a copy of data stored in the parity blocks of each data storage unit 600 as well as the parity block numbers identifying the parity blocks. Then, from the copies of data of the parity blocks received from the data storage units 600, the parity storage unit 600 calculates the exclusive OR of the copy of data with the same parity block number (S2012). After that, the parity storage unit 600 stores the calculation result of the exclusive OR into a parity block whose parity block number, which identifies a parity block of the parity storage unit 600, equals the parity block number received from the data storage units 600 (S2013).

Then, the parity storage unit 600 updates the initial data management table 740 (S2014).

Finally, the parity storage unit 600 references the initial data management table 740 to check if the calculation result of the exclusive OR is stored for all parity blocks (S2015) and, if so ("YES"), terminates processing.

FIGS. 22A, 22B, 22C, and 22D show how the data storage units 600 check if the parity can be generated.

Figure 23:
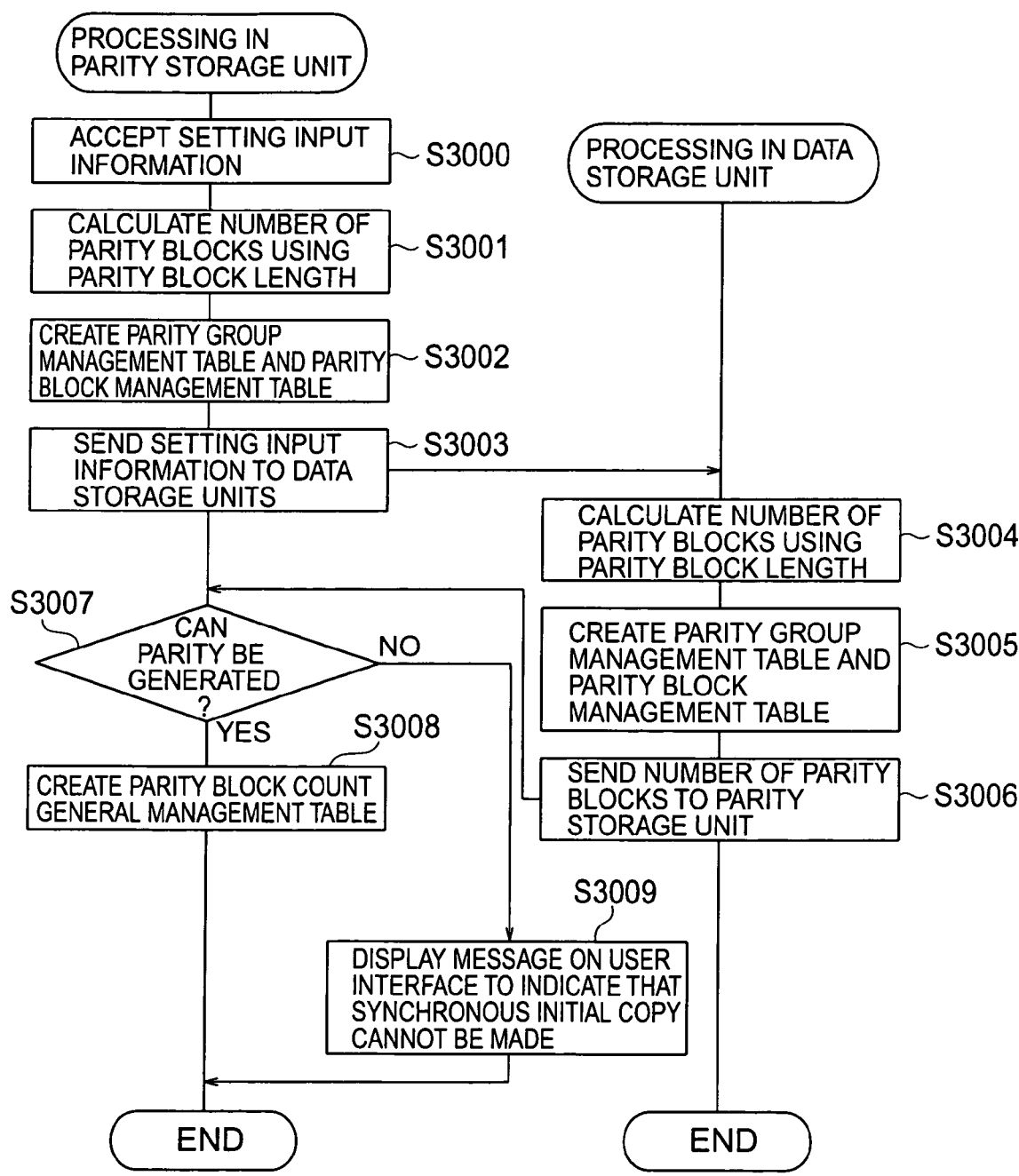
FIG. 23 is a flowchart showing the processing flow in the storage unit in the embodiment.

Next, FIG. 23 shows the flow of processing performed when "Random method" is entered into the "Initialization method" field on the synchronous method parity group setting screen in FIG. 15.

First, the parity storage unit 600 accepts setting input information (S3000).

The parity storage unit 600 uses the entered parity block length to calculate the number of parity blocks (S3001).

The parity storage unit 600 creates the parity group management table 710 and the parity block management table 720 (S3002).

After that, the parity storage unit 600 sends the setting input information to the data storage units 600 (S3003).

Upon receiving this information, the data storage units 600 use the parity block length, sent from the parity storage unit 600, to calculate the number of parity blocks (S3004) and create the parity group management table 710 and the parity block management table 720 (S3005).

The data storage units 600 send the number of parity blocks, calculated in S3004, to the parity storage unit 600 (S3006).

Upon receiving the number of parity blocks from each data storage unit 600, the parity storage unit 600 compares it with the number of parity blocks calculated in S3001 to check if the parity can be generated (S3007). If the number of parity blocks received from the data storage unit 600 is larger than the number of parity blocks calculated in S3001, control is passed to "No" in S3007, a message is sent to the output unit 166 of the management terminal 160 to indicate that the synchronous initial copy cannot be made, and the processing is terminated (S3009).

If the number of parity blocks received from the data storage unit 600 is not larger than the number of parity blocks calculated in S3001, the parity storage unit 600 passes control to "Yes" in S3007 to create the parity block count general management table 730 (S3008).

After that, from the data storage unit 600 that receives a data write request from the information processing unit 200, the parity storage unit 600 receives the calculation result of the exclusive OR of the data, stored in the parity block to which the data write request is issued, and the write data, as well as the parity block number of the parity block to which the data write request is issued. Each time the calculation result of the parity block with the same parity block number is sent from the data storage units 600, the parity storage unit 600 calculates the exclusive OR and stores the calculation result of the exclusive OR into the corresponding parity block.

In this way, the parity blocks of the parity storage unit 600 can store therein the calculation result of the exclusive OR calculated from the data in the corresponding parity blocks of the data storage units 600.

Figure 24:
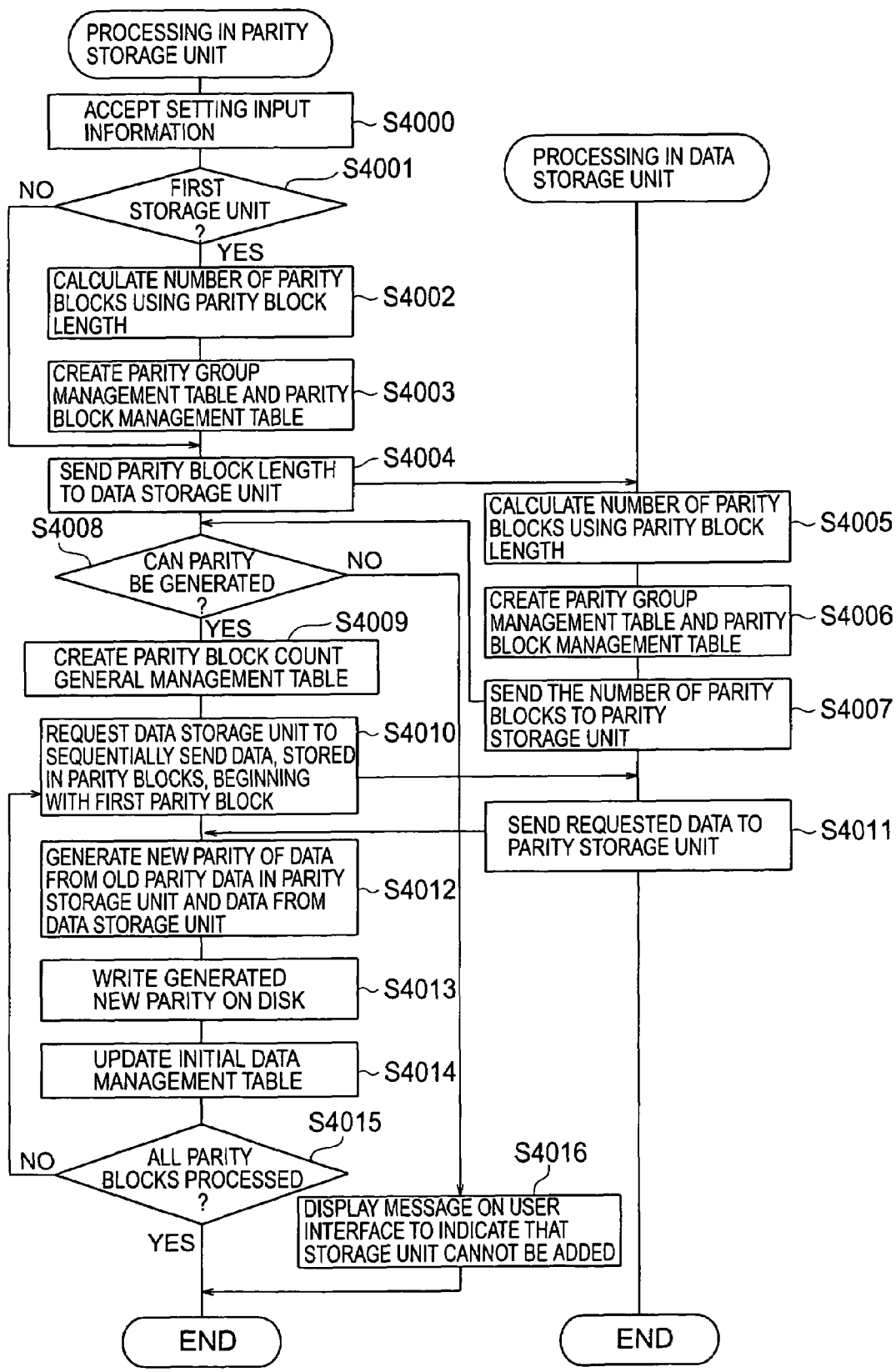
FIG. 24 is a flowchart showing the processing flow in the storage unit in the embodiment.

Next, the flow of processing for storing data, which will be used for backing up the data stored in the data storage units 600, in the parity storage unit 600 in the asynchronous method will be described with reference to FIG. 24.

Figure 25:
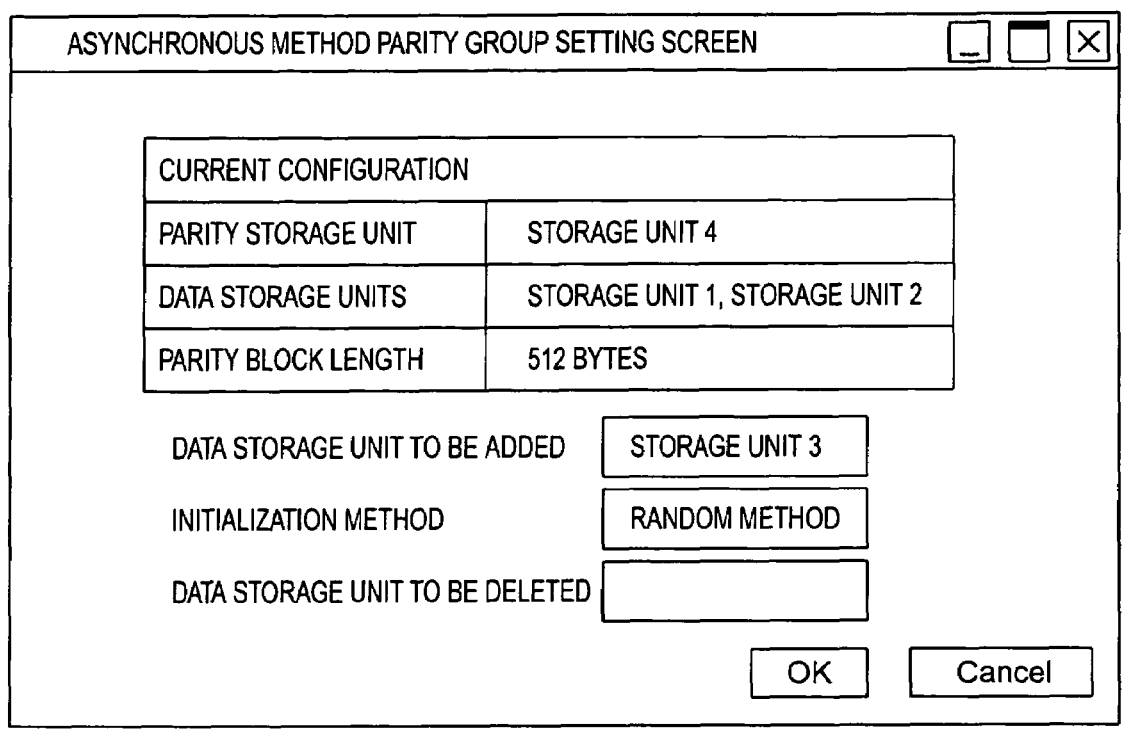
FIG. 25 is a diagram showing an example of a setting screen in the embodiment.

First, the parity storage unit 600 accepts setting input information (S4000). To accept the setting input information in the asynchronous method, the window screen such as the one shown in FIG. 25 is displayed on the output unit 166 of the management terminal 160 to accept the operator's input from the input unit 165. The setting contents accepted from the operator are, for example, "Data storage unit to be added", "Initialization method", and "Data storage unit to be deleted".

In the window screen shown in FIG. 25, the "Current configuration" field contains the current configuration of the storage system. That is, this field indicates that the parity storage unit 600 is storage unit 4 (600), that the data storage units 600 are storage unit 1 (600) and storage unit 2 (600), and that the parity block length is 512 bytes. In this case, the parity blocks of the hard disk drives of storage unit 4 (600) store all the calculation results of the exclusive OR calculated from the data stored in the corresponding parity blocks of storage unit 1 (600) and storage unit 2 (600). FIG. 25 shows an example in which storage unit 3 (600) is added to the "current configuration" as a data storage unit 600. It should be noted that the window screen shown in FIG. 25 is an example only; for example, the screen may also contain a field to allow the operator to change the parity storage unit 600 or to change the parity block length.

Figure 26:
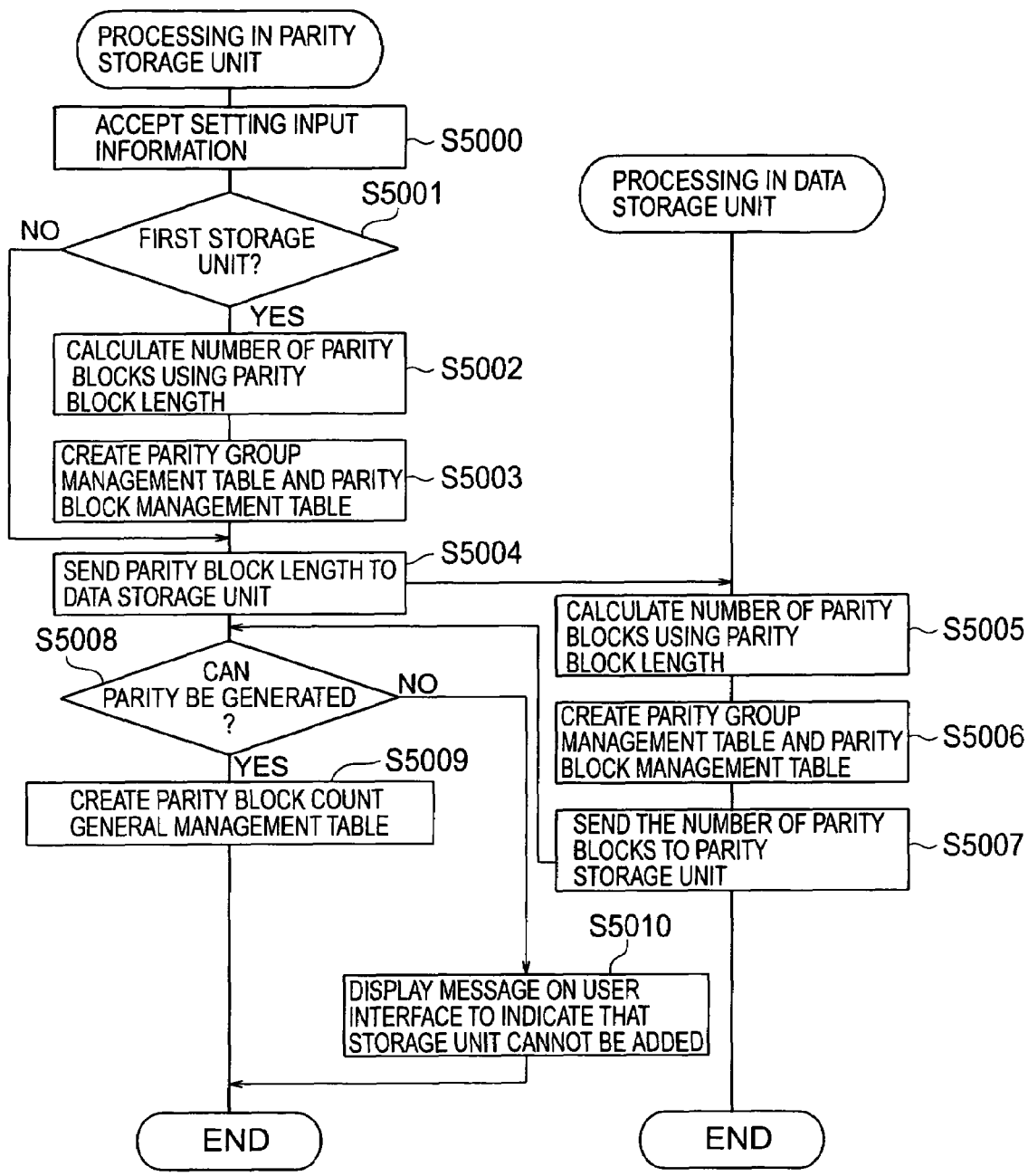
FIG. 26 is a flowchart showing the processing flow in the storage unit in the embodiment.
Figure 32:
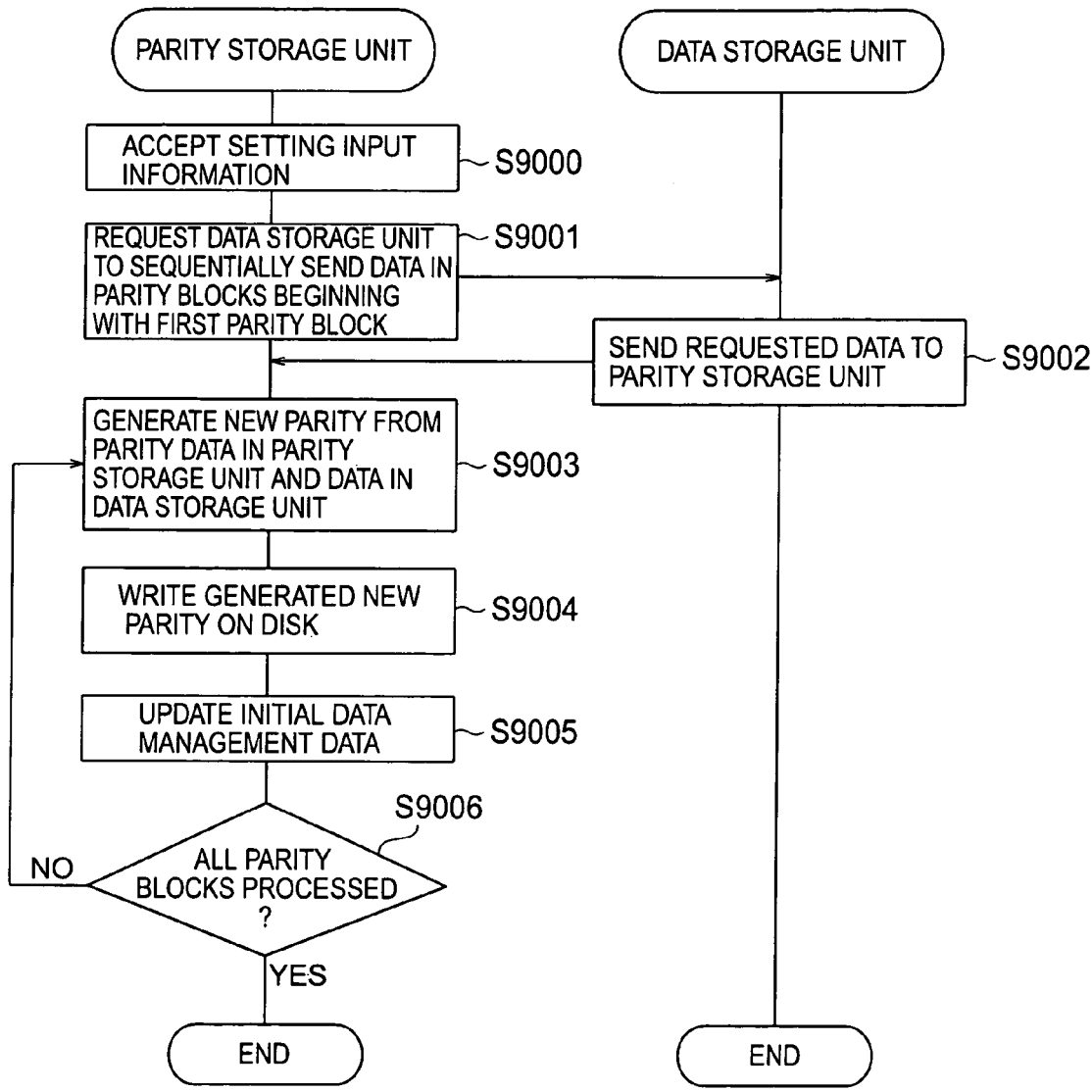
FIG. 32 is a flowchart showing the processing flow in the storage unit in the embodiment.

Clicking the "OK" button on the screen shown in FIG. 25 with the mouse sends the setting input information to the storage unit 600. Although the "initialization method" in FIG. 25 is the "random method", FIG. 24 shows a flowchart of the "sequential method". FIG. 26 shows a flowchart of the "random method". FIG. 32 shows a flowchart when the "data storage unit to be deleted" field contains a data storage unit 600.

First, the parity storage unit 600 checks if the data storage unit 600 contained in the "data storage unit to be added" field is the first storage unit 600 (S4001). The first storage unit 600 refers to the first data storage unit 600. That is, if the "data storage unit" field of the "current configuration" field in the asynchronous parity group setting screen in FIG. 25 does not contain any data storage unit 600, the storage unit 600 in the "data storage unit to be added" field is the first storage unit 600. If the storage unit 600 in the "data storage unit to be added" field is not the first storage unit 600, control is passed to "No" in S4001.

If the storage unit 600 in the "data storage unit to be added" field is the first storage unit 600 in S4001, control is passed to "Yes". The parity storage unit 600 uses the parity block length to calculate the number of parity blocks (S4002).

The parity storage unit 600 creates the parity group management table 710 and the parity block management table 720 (S4003).

After that, the parity storage unit 600 sends the parity block length to the data storage unit 600 to be added (S4004).

Then, the data storage unit 600 to be added uses the parity block length, sent from the parity storage unit 600, to calculate the number of parity blocks (S4005) and creates the parity group management table 710 and the parity block management table 720 (S4006).

The data storage unit 600 to be added sends the number of parity blocks, calculated in S4005, to the parity storage unit 600 (S4007).

Upon receiving the number of parity blocks from the data storage unit 600 to be added, the parity storage unit 600 compares it with the number of parity blocks calculated in S4002 to check if the parity can be generated (S4008). If the number of parity blocks received from the data storage unit 600 to be added is larger than the number of parity blocks calculated in S4002, the parity storage unit 600 passes control to "No" in S4008, displays a message on the output unit 166 of the management terminal 160 to indicate that the data storage unit 600 cannot be added, and terminates processing (S4016).

If the number of parity blocks received from the data storage unit 600 to be added is not larger than the number of parity blocks calculated in S4002, the parity storage unit 600 passes control to "Yes" in S4008 to create the parity block count general management table 730 (S4009).

Next, the parity storage unit 600 sends a request that requests the data storage unit 600 to be added to sequentially send a copy of data (first storage data), stored in the parity blocks, and their parity block numbers in order of parity block numbers beginning with the first parity block (S4010). In response to this request, the data storage unit 600 to be added sequentially sends a copy of data, stored in the parity blocks, and the parity block numbers to the parity storage unit 600 beginning with the first parity block (S4011).

The parity storage unit 600 receives a copy of data, stored in the parity blocks, from the data storage unit 600 to be added as well as the parity block numbers. Then, for each parity block, the parity storage unit 600 calculates the exclusive OR of the copy of data in the parity block, received from the data storage unit 600 to be added, and the data (old parity data, second storage data) in the parity block of the parity storage unit 600 identified by the parity block number equal to the received parity block number (S4012) and stores the calculation result (new parity data) into the parity block of the parity storage unit 600 in which the old parity data has been stored (S4013).

Then, the parity storage unit 600 updates the initial data management table 740 (S4014).

Finally, the parity storage unit 600 references the initial data management table 740, checks if the calculation result of the exclusive OR has been stored in all parity blocks (S4015) and, if so ("Yes"), terminates processing.

By performing the processing described above, the parity blocks of the parity storage unit 600 contain the calculation results of the exclusive OR calculated from the data in the parity blocks corresponding to those of the data storage units 600 including the data storage unit 600 that has been added.

Next, FIG. 26 shows the flow of processing performed when "random method" is entered into the "Initialization method" field on the asynchronous method parity group setting screen in FIG. 25.

First, the parity storage unit 600 accepts setting input information (S5000).

The parity storage unit 600 first checks if the data storage unit 600 contained in the "data storage unit to be added" field is the first storage unit 600 (S5001). If the storage unit 600 in the "data storage unit to be added" field is not the first storage unit 600, control is passed to "No" in S5001.

If the storage unit 600 in the "data storage unit to be added" field is the first storage unit 600, control is passed to "Yes" in S5001. The parity storage unit 600 uses the parity block length to calculate the number of parity blocks (S5002).

The parity storage unit 600 creates the parity group management table 710 and the parity block management table 720 (S5003).

After that, the parity storage unit 600 sends the parity block length to the data storage unit 600 to be added (S5004).

Then, the data storage unit 600 to be added uses the parity block length, sent from the parity storage unit 600, to calculate the number of parity blocks (S5005) and creates the parity group management table 710 and the parity block management table 720 (S5006).

The data storage unit 600 to be added sends the number of parity blocks, calculated in S5005, to the parity storage unit 600 (S5007).

Upon receiving the number of parity blocks from the data storage unit 600 to be added, the parity storage unit 600 compares it with the number of parity blocks calculated in S5002 to check if the parity can be generated (S5008). If the number of parity blocks received from the data storage unit 600 to be added is larger than the number of parity blocks calculated in S5002, the parity storage unit 600 passes control to "No" in S5008, displays a message on the output unit 166 of the management terminal 160 to indicate that the data storage unit 600 cannot be added, and terminates processing (S5010).

If the number of parity blocks received from the data storage unit 600 to be added is not larger than the number of parity blocks calculated in S5002, the parity storage unit 600 passes control to "Yes" in S5008 to create the parity block count general management table 730 (S5009). This completes the processing.

After that, when data to be written on the hard disk drives is received from the information processing unit 200, the added data storage unit 600 calculates the exclusive OR between the write data and the data in the parity block in which the write data is to be written and sends the calculation result, as well as the parity block number of the parity block in which the write data is to be written, to the parity storage unit 600.

When the added data storage unit 600 receives data to be written from the information processing unit 200 to the hard disk drives, the parity storage unit 600 receives from the added data storage unit 600 the calculation result of the exclusive OR calculated by the added data storage unit 600, that is, the exclusive OR between the write data and the data stored in the parity block in which the write data is to be written, as well as the parity block number of the parity block in which the write data is to be written. The parity storage unit 600 calculates the exclusive OR between the received calculation result of the exclusive OR and the data stored in the parity block of the hard disk drive of the parity storage unit 600 identified by a parity block number equal to the received parity block number, and stores the calculation result of the exclusive OR in the parity block of the parity storage unit 600.

By performing the processing described above, the parity blocks of the parity storage unit 600 contain the calculation results of the exclusive OR calculated from the data in the parity blocks corresponding to those of the data storage units 600 including the data storage unit 600 that has been added.

Next, FIG. 32 shows the flow of processing performed when a data storage units is entered into the "data storage unit to be deleted" field on the asynchronous method parity group setting screen in FIG. 25.

To delete the data storage unit 600 from the storage system, the data stored in the parity storage unit 600 and the data stored in the data storage unit 600 to be deleted are exclusively ORed and the calculation result is stored in the parity storage unit 600.

This is because, when storage unit 3 (600) is deleted from a storage system that comprises three data storage units 600, that is, storage unit 1 (600), storage unit 2 (600), and storage unit 3 (600), D4, which is stored in the parity storage unit 600, is expressed as D1(EXOR)D2(EXOR)D3 and the calculation of D4(EXOR)D3 results in D1(EXOR)D2, where D1 is data stored in storage unit 1 (600), D2 is data stored in storage unit 2 (600), and D3 is data stored in storage unit 3 (600).

FIG. 32 shows the flow of processing for deleting the data storage unit 600.

First, the parity storage unit 600 accepts setting input information (S9000).

Then, the parity storage unit 600 sends a request to the data storage unit 600 to be deleted to sequentially send data stored in the parity blocks in order of parity block numbers beginning with the first parity block (S9001). In response to this request, the data storage unit 600 to be deleted sequentially sends a copy of data stored in the parity blocks according to the request, beginning with the first parity block, as well as the parity block numbers (S9002).

The parity storage unit 600 receives a copy of data, stored in the parity blocks, from the data storage unit 600 to be deleted as well as the parity block numbers. Then, for each parity block, the parity storage unit 600 calculates the exclusive OR between the copy of data in the parity block, received from the data storage unit 600 to be deleted, and the data (old parity data) in the parity block of the parity storage unit 600 identified by the parity block number equal to the received parity block number (S9003) and stores the calculation result (new parity data) into the parity block of the parity storage unit 600 in which the old parity data has been stored (S9004).

Then, the parity storage unit 600 updates the initial data management table 740 (S9005). The processing described above is performed for all parity blocks (S9006).

By performing the processing described above, the parity blocks of the parity storage unit 600 contain the calculation results of the exclusive OR calculated from the data in the parity blocks corresponding to those of the data storage units 600 excluding the data storage unit 600 that has been deleted.

===Update of Backup Data===

Figure 27:
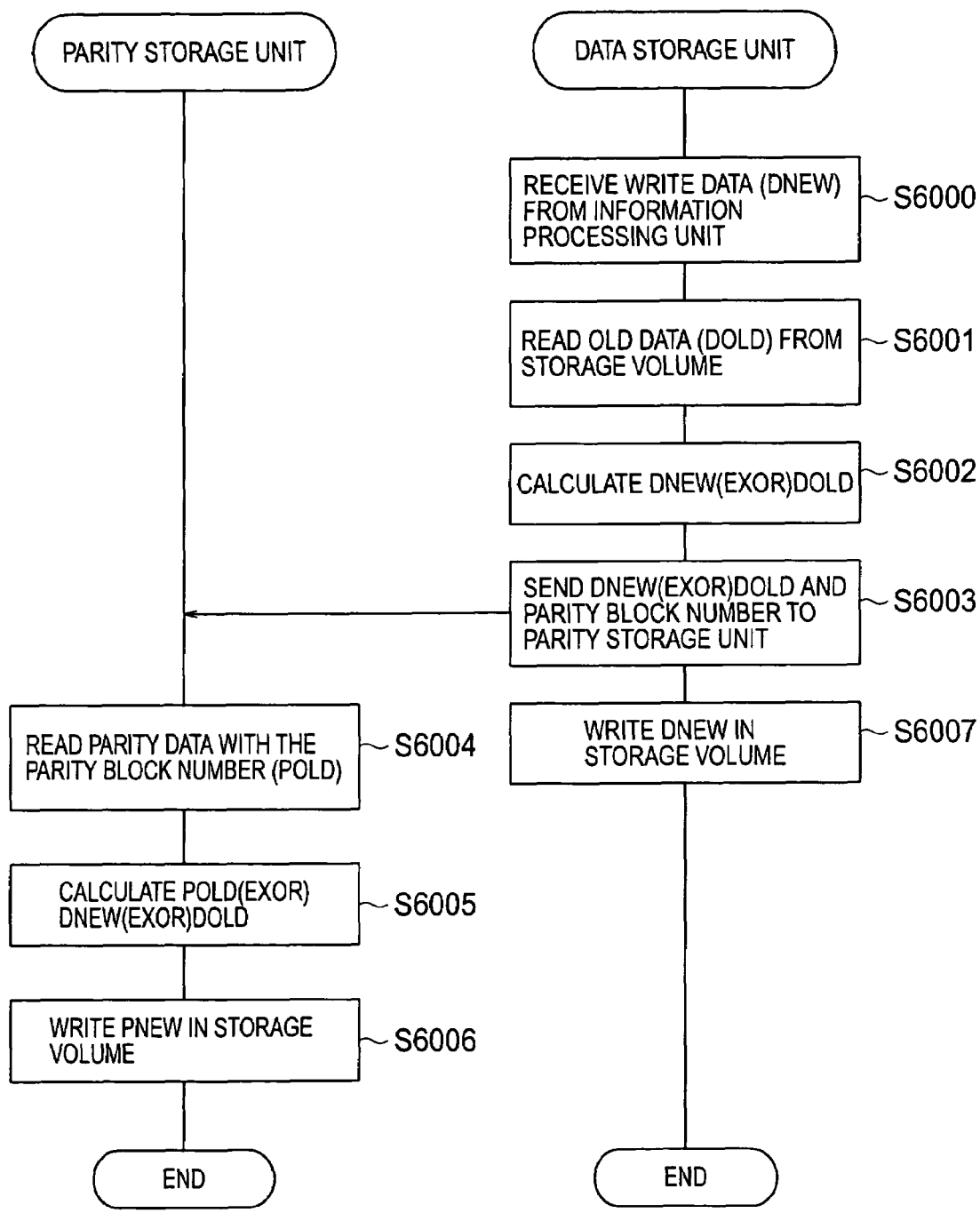
FIG. 27 is a flowchart showing the processing flow in the storage unit in the embodiment.

As described above, the data for backing up the data in the data storage units 600, that is, all calculation results of the exclusive OR calculated from the data stored in the corresponding parity blocks of the data storage units 600, is stored in the parity blocks of the hard disk drives of the parity storage unit 600. After that, each time the data storage units 600 receive a data write request from the information processing unit 200 and the data stored in their hard disk drives is updated, the data stored in the parity storage unit 600 and used for backing up the data in the data storage units 600 is updated. FIG. 27 shows the flow of processing for updating the data stored in the parity storage unit 600 and used for backing up the data stored in the data storage units 600.

First, the data storage unit 600 receives a data write request and write data (DNEW) from the information processing unit 200 (S6000). In response to this request, the data storage unit 600 reads data (old data, DOLD) stored in the parity block of the storage volume 310 in which the write data is to be written (S6001). Next, the data storage unit 600 calculates the exclusive OR between the write data and the data stored in the parity block of the storage volume 310 in which the write data is to be written (S6002). The data storage unit 600 sends the calculation result of the exclusive OR and the parity block number to the parity storage unit 600 (S6003).

Upon receiving the result of the exclusive OR and the parity block number, the parity storage unit 600 reads the data (parity data, POLD) stored in the parity block of the parity storage unit 600 identified by the parity block number equal to the received parity block number (S6004). The parity storage unit 600 calculates the exclusive OR between the parity data that is read and the result of the exclusive OR described above (S6005). The calculation result (PNEW) is stored in the parity block (S6006).

By performing the above processing, when the data stored in the data storage unit 600 is updated by a data write request from the information processing unit 200, the data stored in the parity storage unit 600 and used for backing up the data in the data storage unit 600 can also be updated.

===Restoration of Data===

Figure 28:
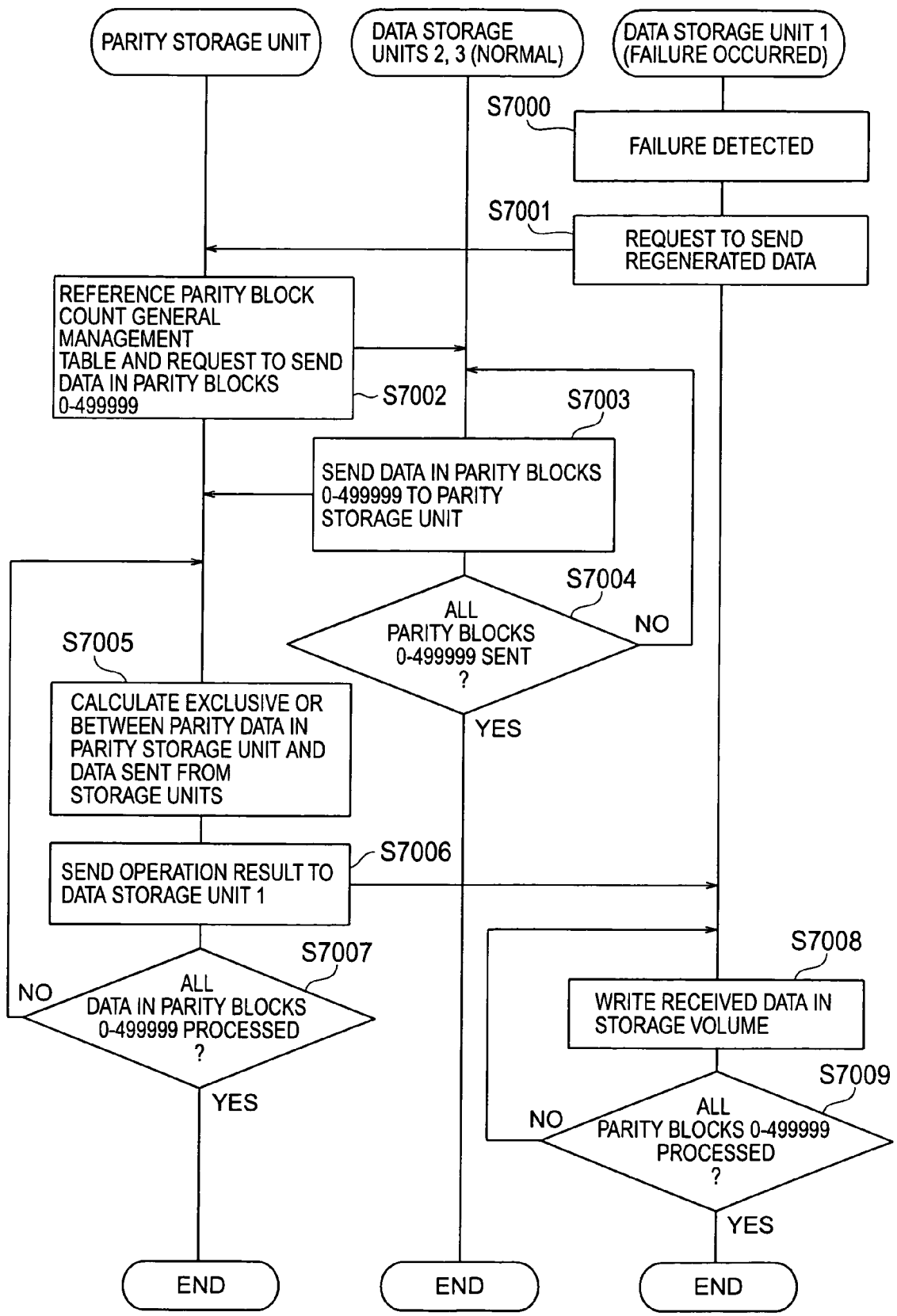
FIG. 28 is a flowchart showing the processing flow in the storage unit in the embodiment.
Figure 29:
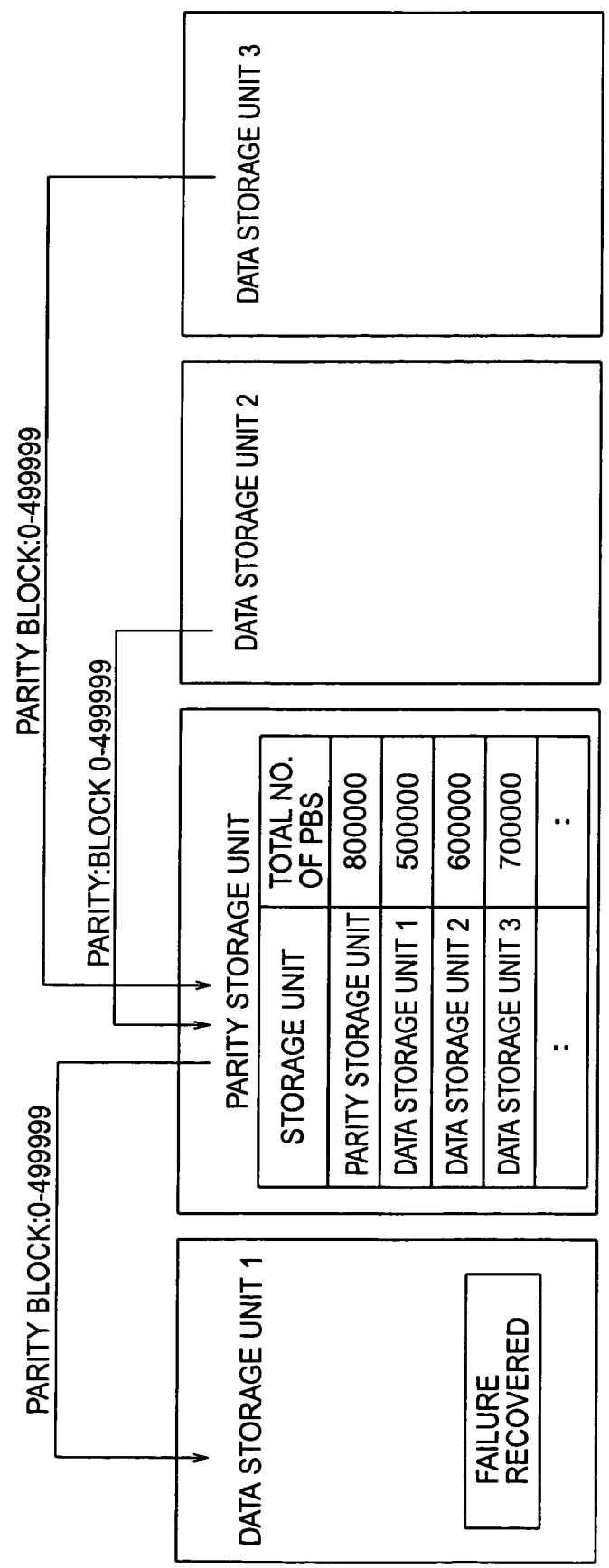
FIG. 29 is a diagram showing the contents of processing in the storage unit in the embodiment.

Next, the flow of processing for restoring the data stored in the data storage unit 600 will be described with reference to FIGS. 28 to 31. In the example described below, the data stored in storage unit 1 (one of other storage units, first storage unit) (600) is restored in a storage system comprising three data storage units, that is, storage unit 1 (600), storage unit 2 (600), and storage unit 3 (600). As shown in FIG. 29, it is assumed that that number of parity blocks of storage unit 1 (600) is 500,000, that of storage unit 2 (600) is 600,000, that of storage unit 3 (600) is 700,000, and that of the parity storage unit 600 is 800,000.

The data stored in storage unit 1 (600) is restored in one of two methods. In the first method, the parity storage unit 600 receives 500,000 parity blocks of data, necessary for restoring data to storage unit 1 (600), from storage unit 2 (600) and storage unit 3 (600) for restoring data back to storage unit 1 (600). On the other hand, in the second method, the parity storage unit 600 receives 800,000 parity blocks of data, which is equal to the number of parity blocks in the parity storage unit 600, from storage unit 2 (600) and storage unit 3 (600), restores 800,000 parity blocks of data, and sends it to storage unit 1 (600). The advantage of restoring data in the first method is that the minimum amount of data is transferred among the storage units 600 during data restoration. Therefore, the data restoration requires relatively less time. On the other hand, the data restoration in the second method eliminates the need for the parity storage unit 600 to manage the number of parity blocks of the data storage units 600. That is, the parity block count general management table 730 shown in FIG. 12 need not be stored in the shared memory 120.

The first method will be described with reference to FIG. 28 and FIG. 29.

Upon detecting a failure in the data stored in the hard disk drives through the failure detection program 840 (S7000), storage unit 1 (600) sends a request to the parity storage unit 600 to request it to transmit the original data to be stored in the parity blocks of the hard disk drives (S7001).

In response to the transmission request described above, the parity storage unit 600 references the parity block count general management table 730 and sends a transmission request, which requests to send a copy of a total of 500,000 parity blocks of data (parity block numbers 0-499,999) as well as their parity block numbers, to the storage units 600 other than the first storage unit 1 (600) (the first storage units other than the first storage unit that has sent the transmission request for the first storage data), that is, storage unit 2 (600) and storage unit 3 (600) (S7002).

In response to this request, storage unit 2 (600) and storage unit 3 (600) send a copy of data of parity blocks with parity block numbers 0-499,999 as well as their parity block numbers (S7003, S7004).

When a copy of data of parity blocks with parity block numbers 0-499,999 and their parity block numbers are received each from storage unit 2 (600) and storage unit 3 (600), the parity storage unit 600 calculates an exclusive OR between the copy of the received data described above and the data stored in the parity blocks in the parity storage unit 600 with a correspondence established between the received parity block numbers and those of the parity blocks in the parity storage unit 600 (S7005). The parity storage unit 600 sends the calculation result of the exclusive OR, as well as their parity block numbers, to storage unit 1 (600) (S7006, S7007).

Storage unit 1 (600) receives the calculation result and the parity block numbers and writes the calculation result into the parity blocks of the storage volume 310 identified by the parity block numbers (S7008, S7009).

The above processing restores data to be stored in storage unit 1 (600).

Figure 30:
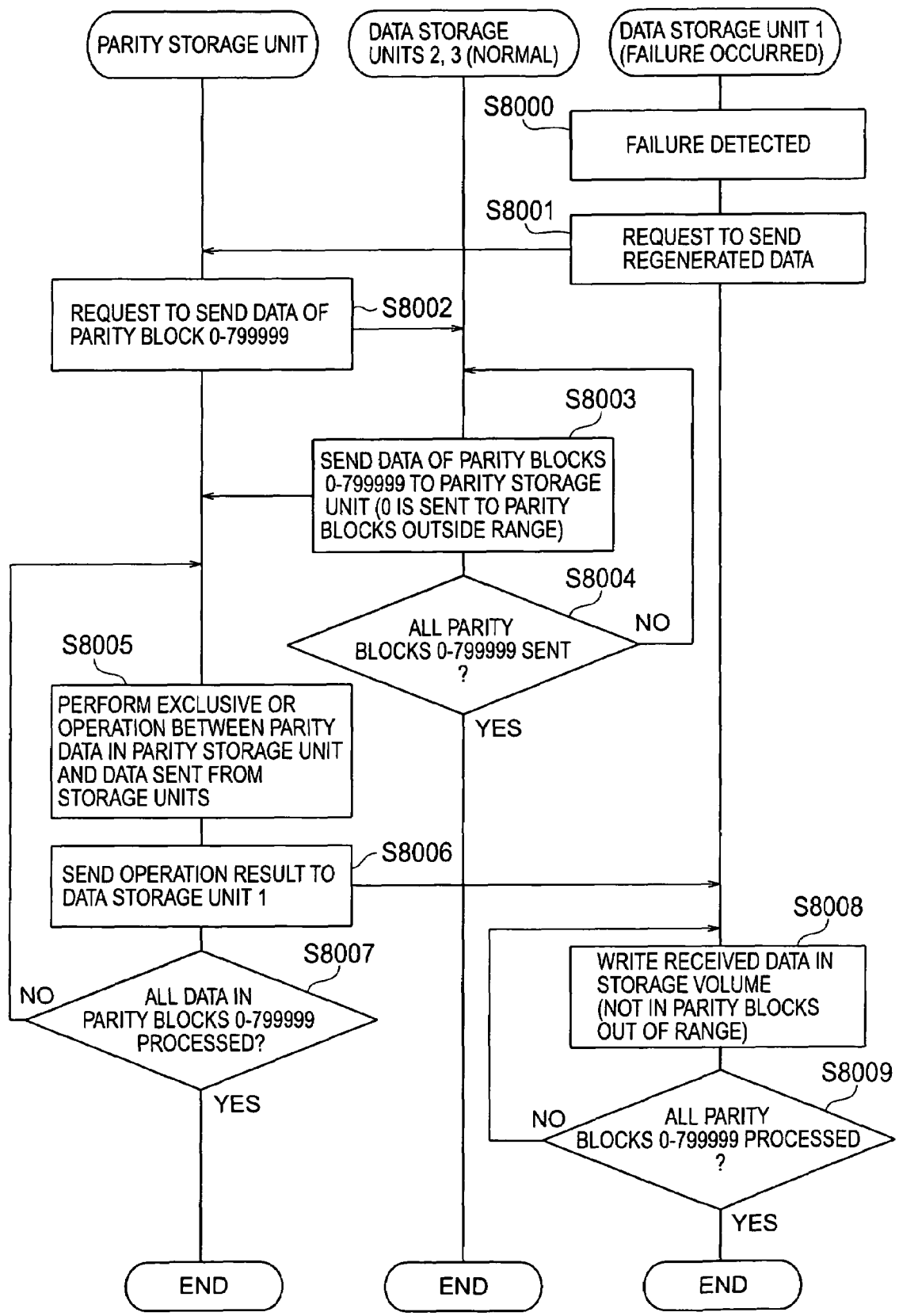
FIG. 30 is a flowchart showing the processing flow in the storage unit in the embodiment.
Figure 31:
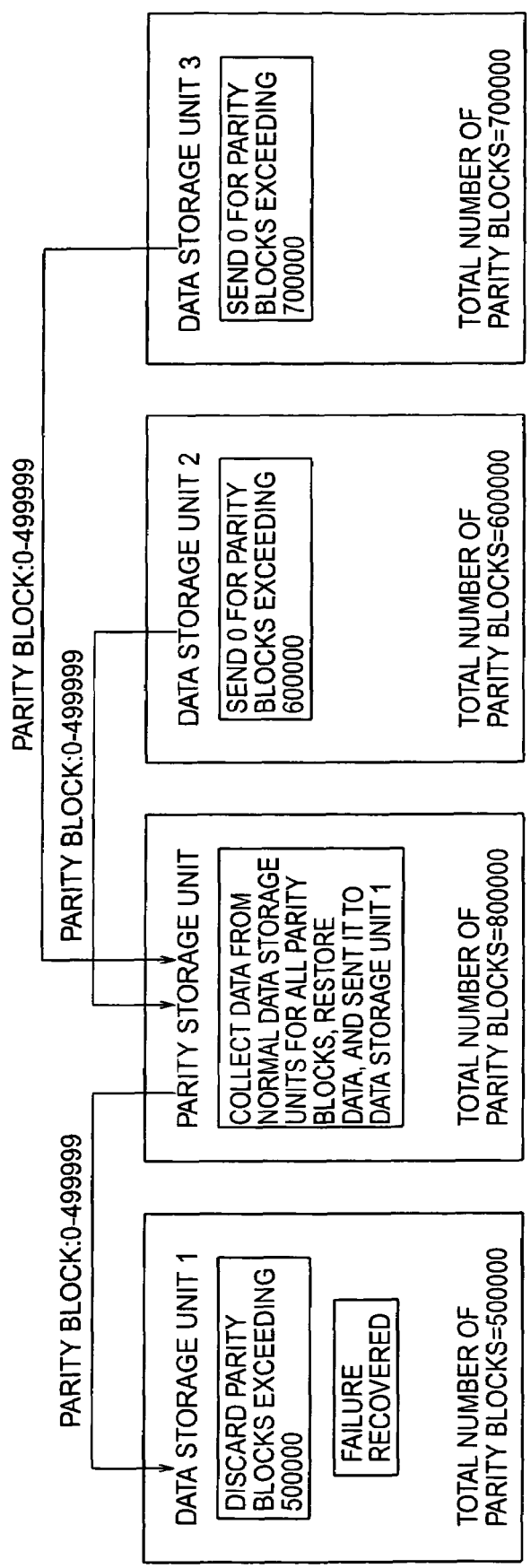
FIG. 31 is a diagram showing the contents of processing in the storage unit in the embodiment.

Next, the second method will be described with reference to FIG. 30 and FIG. 31.

Upon detecting a failure in the data stored in the hard disk drives through the failure detection program 840 (S8000), storage unit 1 (600) sends a request to the parity storage unit 600 to request it to transmit the original data to be stored in the parity blocks of the hard disk drives (S8001).

In response to the transmission request described above, the parity storage unit 600 sends a transmission request, which requests to send a copy of a total of 800,000 parity blocks of data (parity block numbers 0-799,999) as well as their parity block numbers, to the storage units 600 other than storage unit 1 (600) (the first storage units other than the first storage unit that has sent the transmission request for the first storage data), that is, storage unit 2 (600) and storage unit 3 (600) (S8002).

In response to this request, storage unit 2 (600) and storage unit 3 (600) send a copy of data of parity blocks with parity block numbers 0-799,999 as well as their parity block numbers (S8003, S8004). Because storage unit 2 (600) has 600,000 parity blocks, there are no parity blocks with parity block numbers 600,000 to 799,999. Therefore, storage unit 2 (600) sends data to the parity storage unit 600 assuming that the parity blocks with parity block numbers 600,000 to 799,999 contain 0. Similarly, because storage unit 3 (600) has 700,000 parity blocks, there are no parity blocks with parity block numbers 700,000 to 799,999. Therefore, storage unit 3 (600) sends data to the parity storage unit 600 assuming that the parity blocks with parity block numbers 700,000 to 799,999 contain 0.

When a copy of data of parity blocks with parity block numbers 0-799,999 and their parity block numbers are received each from storage unit 2 (600) and storage unit 3 (600), the parity storage unit 600 calculates an exclusive OR between the copy of the received data described above and the data stored in the parity blocks in the parity storage unit 600 with a correspondence established between the received parity block numbers and those of the parity blocks in the parity storage unit 600 (S8005). The parity storage unit 600 sends the result of the exclusive OR, as well as their parity block numbers, to storage unit 1 (600) (S8006, S8007).

Storage unit 1 (600) receives the calculation result and the parity block numbers and writes the calculation result into the parity blocks of the storage volume 310 identified by the parity block numbers (S8008, S8009). Because storage unit 1 (600) has 500,000 parity blocks, there are no parity blocks with parity block numbers 500,000 to 799,999. Therefore, storage unit 1 (600) does not write on the storage volume 310 for the parity blocks with parity block numbers 500,000 to 799999.

As described above, the data stored in storage unit 1 (600) can be restored also by the second method.

When the data stored in the data storage unit 600 is restored as described above, it is assumed that all the calculation results of the exclusive OR, performed on the data stored in the parity blocks of all data storage units 600, have already been stored in the parity blocks of the hard disk drives of the parity storage unit 600.

However, when the data storage unit 600 is added to the storage system and the data stored in the parity blocks of the parity storage unit 600 is being updated in the asynchronous method, one of the data storage units 600 may sometimes require that the original data stored on the hard disk drives of that data storage unit 600 be restored.

In this case, if the update progress of data stored in the parity blocks of the parity storage unit 600 is stored in the initial data management table 740 shown in FIG. 13B and FIG. 13C, it is possible to start data restoration without waiting for the termination of the update of data stored in the parity blocks of the parity storage unit 600 even if the update is being executed because the data storage unit 600 is added.

That is, when the parity storage unit 600 sends a transmission request to the data storage units 600, other than the data storage unit 600 that has detected a failure, to request them to send a copy of data of the parity blocks as well as their parity block numbers, the parity storage unit 600 sends a transmission request as follows. That is, for the data in the parity blocks identified by the parity block numbers of the updated parity blocks, the parity storage unit 600 sends a transmission request to the data storage units 600 including the added data storage unit 600. For the data in the parity blocks identified by the parity block numbers of the non-updated parity blocks, the parity storage unit 600 sends a transmission request to the data storage units 600 not including the added data storage units 600.

This allows restored data to be sent quickly to the data storage unit 600 that has detected the failure.

The storage unit 600 in this embodiment has been described. In this embodiment, the parity blocks of the parity storage unit 600 can store the calculation results of the exclusive OR of the data of the parity blocks corresponding to each of a plurality of data storage units 600. Therefore, when data stored in the storage area of one of the data storage units 600 is lost and the lost data must be restored, it is possible to restore the lost data by calculating the exclusive OR of the data stored in the storage areas of the storage units 600 other than the data storage unit 600 in which the data is lost.

That is, in this embodiment, the data stored in the storage areas of data storage units 600 can be backed up no matter how many data storage units 600 are connected communicably to the parity storage unit 600. This embodiment therefore streamlines the data backup operation and minimizes the number of storage units 600 required for backing up data. Therefore, this embodiment decreases the backup cost and, in addition, decreases the overall information processing system cost.

According to the storage unit 600 in this embodiment, the storage area of the parity storage unit 600 and that of the data storage unit 600 are logically partitioned according to the parity data length. This logical partitioning makes the storage areas of both types of storage unit 600 correspond to each other on a parity block basis. That is, for the same parity block number, a correspondence is established between the parity blocks of the parity storage unit 600 and those of the data storage units 600. This allows the data stored in data storage units 600 to be backed up even when a storage system is configured by storage units 600 using different control methods of the storage volume 310 such as the CKD method used primarily for a mainframe information processing system and an FBA method used primarily for an open information processing system.

While a preferred embodiment of the present invention has been described, the embodiment described above is for illustrative purposes only and not restrictive. The present invention may be modified and changed without departing from the spirit thereof and, at the same time, the present invention includes the equivalents.

The present application claims priority upon Japanese Patent Application No. 2004-019739 filed on Jan. 28, 2004. The disclosure of the Japanese Patent Application is incorporated herein by reference.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array system connected communicably to a plurality of other disk array systems each having a plurality of first hard disk drives on which data is stored, wherein each of said plurality of other disk array systems is arranged to receive and store data from a different respective information processing unit in response to commands received therefrom, each said information processing unit writing and reading said data to and from said corresponding one of said plurality of other disk array systems, said disk array system comprising:

a plurality of second hard disk drives on which data is stored; and a second storage controller including:

a first receiving unit that receives copies of first storage data and first identifiers from respective first storage controllers of said other disk array systems, said first storage data being stored in a plurality of first storage blocks created by logically partitioning a data storage area of said plurality of first hard disk drives, said first identifiers identifying the first storage blocks;

a first operation controller that calculates an exclusive OR of the copies of the first storage data, with a correspondence established among the first identifiers, from the copies of the first storage data received by said first receiving unit from said other disk array system; and a first disk controller that stores a calculation result of the exclusive OR, calculated by said first operation controller, into second storage blocks of said second hard disk drives, said second storage blocks of said second hard disk drives having second identifiers corresponding to the first identifiers, said second identifiers individually identifying said second storage blocks, and said second storage blocks being created by logically partitioning a data storage area of said plurality of second hard disk drives such that the second storage blocks have a block length equal to the block length of the first storage blocks, wherein the first identifiers include first block numbers identifying said first storage blocks in corresponding ones of said other disk array systems, said second identifiers include second block numbers identifying said second storage blocks in said disk array system, and said first block numbers are identical to said second block numbers for corresponding first and second identifiers for all of said disk array system and other disk array systems.

2. The disk array system according to claim 1, wherein all calculation results of the exclusive OR calculated by said first operation controller are stored on said second hard disk drives, said disk array system further comprising:
 a second receiving unit that receives a calculation result of an exclusive OR between write data and the first storage data, as well as the first identifier that identifies the first storage block in which the write data is to be written, from one of said other disk array systems, said calculation result being calculated by said other disk array system that receives the write data to said first hard disk drives from an information processing unit, said first storage data being stored in the first storage block of said first hard disk drives in which the write data is to be written;
 a second operation controller that calculates an exclusive OR between the calculation result received by said second receiving unit and second storage data stored in the second storage block of said second hard disk drives identified by the second identifier corresponding to the first identifier received by said second receiving unit; and
 a second disk controller that stores a calculation result of the exclusive OR, calculated by said second operation controller, into the second storage block of said second hard disk drives identified by the second identifier.

3. The disk array system according to claim 1, wherein all calculation results of the exclusive OR calculated by said first operation controller are stored on said second hard disk drives, said disk array system further comprising, when another communicably connected disk array system is added as one of said other disk array systems:
 a third receiving unit that receives a copy of the first storage data and the first identifiers from said added other disk array system, said first storage data being stored in the first storage blocks of said first hard disk drives of said added other disk array system;
 a third operation controller that calculates an exclusive OR between the copy of said first storage data received by said third receiving unit and second storage data stored in the second storage blocks of said second hard disk drives identified by the second identifiers corresponding to the first identifiers received by said third receiving unit; and
 a third disk controller that stores a calculation result of the exclusive OR, calculated by said third operation controller, into the second storage blocks of said second hard disk drives identified by the second identifiers.

4. The disk array system according to claim 1, wherein all calculation results of the exclusive OR calculated by said first operation controller are stored on said second hard disk drives, said disk array system further comprising, when another communicably connected disk array system is added as one of said other disk array systems:
 a fourth receiving unit that receives a calculation result of an exclusive OR between write data and the first storage data as well as the first identifier, which identifies the first storage block into which the write data is to be written, from said added other disk array system, said calculation result being calculated by said added other disk array system that receives the write data to said first hard disk drives of said added other storage from an information processing unit, said first storage data being stored in the first storage block of said first hard disk drives in which the write data is to be written;
 a fourth operation controller that calculates an exclusive OR between the calculation result received by said fourth receiving unit and second storage data stored in the second storage block of said second hard disk drives identified by the second identifier corresponding to the first identifier received by said fourth receiving unit; and
 a fourth disk controller that stores a calculation result of the exclusive OR, calculated by said fourth operation controller, into the second storage block of said second hard disk drives identified by the second identifier.

5. The disk array system according to claim 1, wherein all calculation results of the exclusive OR calculated by said first operation controller are stored on said second hard disk drives, said disk array system further comprising:
 a fifth receiving unit that receives, from one of said other disk array systems, a request to send the first storage data to be stored in said first hard disk drives of said one of said other disk array systems;
 a first sending unit that sends a request to send a copy of the first storage data, which is stored in the first storage blocks of said first hard disk drives, as well as the first identifiers that identify the first storage blocks in which the first storage data is stored, to said other disk array systems other than said one of said other disk array systems;
 a sixth receiving unit that receives the copy of the first storage data as well as the first identifiers from each of the other disk array systems other than said one of said other disk array systems;
 a fifth operation controller that calculates an exclusive OR between copies of the first storage data and second storage data, said copies of the first storage data being the copies of the first storage data received by said sixth receiving unit from said other disk array systems other than said one of other disk array systems and corresponding to the first identifiers, said second storage data being stored in the second storage blocks of said second hard disk drives identified by the second identifiers corresponding to the first identifiers received by said sixth receiving unit; and
 a second sending unit that sends a calculation result of the exclusive OR calculated by said fifth operation controller, as well as the first identifiers, to said one of said other disk array systems.

6. A method of controlling a disk array system connected communicably to a plurality of other disk array systems each having a plurality of first hard disk drives on which data is stored, said disk array system having a plurality of second hard disk drives on which data is stored, wherein each of said plurality of other disk array systems is arranged to receive and store data from a different respective information processing unit in response to commands received therefrom, each said information processing unit writing and reading said data to and from said corresponding one of said plurality of other disk array systems, said method comprising the steps of:
 receiving, in a second storage controller of said disk array system, copies of first storage data and first identifiers from a first storage controller of each of said other disk array systems, respectively, said first storage data being stored in a plurality of first storage blocks created by logically partitioning a data storage area of said plurality of first hard disk drives, said first identifiers identifying the first storage blocks;

calculating, in said second storage controller, an exclusive OR of the copies of the first storage data, with a correspondence established among the first identifiers, from the copies of the first storage data received from said other disk array systems; and storing, by said second storage controller, a calculation result of the exclusive OR into second storage blocks of said second hard disk drives, said second storage blocks of said second hard disk drives having second identifiers corresponding to the first identifiers, said second identifiers individually identifying said second storage blocks, and said second storage blocks being created by logically partitioning a data storage area of said plurality of second hard disk drives such that the second storage blocks have a block length equal to the block length of the first storage blocks;

wherein the first identifiers include first block numbers identifying said first storage blocks in corresponding ones of said other disk array systems, said second identifiers include second block numbers identifying said second storage blocks in said disk array system, and said first block numbers are identical to said second block numbers for corresponding first and second identifiers for all of said disk array system and other disk array systems.

7. The method of controlling a disk array system according to claim 6, wherein all calculation results of the exclusive OR are stored on said second hard disk drives, said method further comprising the steps of:

receiving a calculation result of an exclusive OR between write data and the first storage data, as well as the first identifier that identifies the first storage block in which the write data is to be written, from one of said other disk array system, said calculation result being calculated by said other disk array system that receives the write data to said first hard disk drives from an information processing unit, said first storage data being stored in the first storage block of said first hard disk drives in which the write data is to be written;

calculating an exclusive OR between the calculation result and second storage data stored in the second storage block of said second hard disk drives identified by the second identifier corresponding to the first identifier; and storing a calculation result of the exclusive OR into the second storage block of said second hard disk drives identified by the second identifier.

8. The method of controlling a disk array system according to claim 6, wherein all calculation results of the exclusive OR are stored on said second hard disk drives, said method further comprising the steps of, when another communicably connected disk array system is added as one of said other disk array systems:

receiving a copy of the first storage data and the first identifiers from said added other disk array system, said first storage data being stored in the first storage blocks of said first hard disk drives of said added other disk array system;

calculating an exclusive OR between the copy of said first storage data and second storage data stored in the second storage blocks of said second hard disk drives identified by the second identifiers corresponding to the first identifiers; and storing a calculation result of the exclusive OR into the second storage blocks of said second hard disk drives identified by the second identifiers.

9. The method of controlling a disk array system according to claim 6, wherein all calculation results of the exclusive OR are stored on said second hard disk drives, said method further comprising the steps of, when another communicably connected disk array system is added as one of said other disk array systems:

receiving a calculation result of an exclusive OR between write data and the first storage data as well as the first identifier, which identifies the first storage block into which the write data is to be written, from said added other disk array system, said calculation result being calculated by said added other disk array system that receives the write data to said first hard disk drives of said added other storage from an information processing unit, said first storage data being stored in the first storage block of said first hard disk drives in which the write data is to be written;

calculating an exclusive OR between the calculation result and second storage data stored in the second storage block of said second hard disk drives identified by the second identifier corresponding to the first identifier; and storing a calculation result of the exclusive OR into the second storage block of said second hard disk drives identified by the second identifier.

10. The method of controlling a disk array system according to claim 6, wherein all calculation results of the exclusive OR are stored on said second hard disk drives, said method further comprising the steps of:

receiving, from one of said other disk array systems, a request to send the first storage data to be stored in said first hard disk drives of said one of said other disk array systems;

sending a request to send a copy of the first storage data, which is stored in the first storage blocks of said first hard disk drives, as well as the first identifiers that identify the first storage blocks in which the first storage data is stored, to said other disk array systems other than said one of said other storage units;

receiving the copy of the first storage data as well as the first identifiers from each of the other disk array systems other than said one of said other disk array systems;

calculating an exclusive OR between copies of the first storage data and second storage data, said copies of the first storage data being the copies of the first storage data from said other disk array systems other than said one of other disk array systems and corresponding to the first identifiers, said second storage data being stored in the second storage blocks of said second hard disk drives identified by the second identifiers corresponding to the first identifiers; and sending a calculation result of the exclusive OR as well as the first identifiers to said one of said other disk array systems.

11. A disk array system comprising a plurality of first disk array systems each having a first storage controller and a plurality of first hard disk drives on which data is stored; and a second disk array system connected communicably to the first disk array systems and having a second storage controller and a plurality of second hard disk drives on which data is stored, wherein each of said first disk array systems is arranged to receive and store data from a different respective information processing unit in response to commands received therefrom, each said information processing unit writing and reading said data to and from said corresponding disk array system, wherein in each of said first disk array systems:

said first storage controller sends a copy of first storage data and first identifiers to said second disk array system, said first storage data being stored in a plurality of first storage blocks created by logically partitioning a data storage area of said plurality of first hard disk drives, said first identifiers identifying the first storage blocks, and wherein in said second disk array system, said second storage controller comprises:

a first data receiving unit that receives copies of the first storage data and the first identifiers from said first disk array systems;

a first data operation controller that calculates an exclusive OR of the copies of the first storage data, with a correspondence established among the first identifiers, from the copies of the first storage data received by said first receiving unit from said first disk array systems; and a first disk controller that stores a calculation result of the exclusive OR, calculated by said first data operation controller, into second storage blocks of said second hard disk drives, said second storage blocks of said second hard disk drives having second identifiers corresponding to the first identifiers, said second identifiers individually identifying said second storage blocks, and said second storage blocks being created by logically partitioning a data storage area of said plurality of second hard disk drives such that the second storage blocks have a block length equal to the block length of the first storage blocks, wherein the first identifiers include first block numbers identifying said first storage blocks in corresponding ones of said other disk array systems, said second identifiers include second block numbers identifying said second storage blocks in said disk array system, and said first block numbers are identical to said second block numbers for corresponding first and second identifiers for all of said disk array system and other disk array systems.

12. The disk array system according to claim 11, wherein all calculation results of the exclusive OR calculated by said first data operation controller are stored on said second hard disk drives, wherein each of said first disk array systems further comprises:

a second data operation controller that, when write data to said first hard disk drives is received from an information processing unit, calculates an exclusive OR between the write data and the first storage data stored in the first storage block of said first hard disk drives into which the write data is to be written; and a second data sending unit that sends a calculation result of the exclusive OR calculated by said second data operation controller, as well as said first identifier that identifies the first storage block into which the write data is to be written, to said second disk array system, and said second disk array system comprises:

a second data receiving unit that receives a calculation result of the exclusive OR, calculated by said second data operation controller, as well as the first identifier, from said first disk array system;

a third data operation controller that calculates an exclusive OR between the calculation result received by said second data receiving unit and second storage data stored in the second storage block of said second hard disk drives identified by the second identifier corresponding to the first identifier received by said second data receiving unit; and a second disk controller that stores a calculation result of the exclusive OR, calculated by said third data operation controller, into the second storage block of said second hard disk drives identified by the second identifier.

13. The disk array system according to claim 11, wherein all calculation results of the exclusive OR calculated by said first data operation controller are stored on said second hard disk drives, wherein said second disk array system further comprises:

a third data sending unit that, when another disk array system connected communicably to said second disk array system is added as one of said first disk array systems, sends a request to send a copy of the first storage data stored in the first storage blocks of said first hard disk drives, as well as the first identifiers that identify the storage blocks in which the first storage data is stored, to said added first disk array system, said first disk array system further comprises:

a fourth data sending unit that, in response to the request to send, sends the copy of the first storage data stored in the first storage blocks of said first hard disk drives, as well as the first identifiers, to said second disk array system, said second disk array system further comprises:

a third data receiving unit that receives the copy of the first storage data, as well as the first identifiers, from said first disk array system;

a fourth data operation controller that calculates an exclusive OR between the copy of the first storage data received by said third data receiving unit and second storage data stored in the second storage blocks of said second hard disk drives identified by the second identifiers corresponding to the first identifiers received by said third data receiving unit; and a third disk controller that stores a calculation result of the exclusive OR calculated by said fourth data operation controller into the second storage blocks of said second hard disk drives identified by said second identifiers.

14. The disk array system according to claim 11, wherein all calculation results of the exclusive OR calculated by said first data operation controller are stored on said second hard disk drives, wherein, when another disk array system connected communicably to said second disk array system is added as one of said first disk array systems, said added first disk array system further comprises:

a fifth data operation controller that, when write data to said first hard disk drives is received from an information processing unit, calculates an exclusive OR between the write data and the first storage data stored in the first storage block of said first hard disk drives into which the write data is to be written; and a fifth data sending unit that sends a calculation result of the exclusive OR calculated by said fifth data operation controller, as well as the first identifier identifying the first storage block into which the write data is to be written, to said second disk array system, and said second disk array system further comprises:
a fourth data receiving unit that receives a calculation result of the exclusive OR calculated by said fifth data operation controller, as well as the first identifier, from said added first dist array system;
a sixth data operation controller that calculates an exclusive OR between the calculation result received by said fourth data receiving unit and second storage data stored in the second storage block of said second hard disk drives identified by said second identifier corresponding to the first identifier received by said fourth data receiving unit; and
a fourth disk controller that stores a calculation result of the exclusive OR calculated by said sixth data operation controller into the second storage block of said second hard disk drives identified by said second identifier.

15. The disk array system according to claim 11, wherein all calculation results of the exclusive OR calculated by said first data operation controller are stored on said second hard disk drives,
wherein each of said first disk array systems further comprises:
a sixth data sending unit that sends a request to send the first storage data to be stored in said first hard disk drives of said first disk array system to said second disk array system,
said second disk array system further comprises:
a fifth data receiving unit that receives the request to send the first storage data from said first disk array system;
a seventh data sending unit that, in response to the request to send the first storage data, sends a request to send a copy of the first storage data, which is stored in the first storage blocks of said first hard disk drives, as well as the first identifiers that identify the first storage blocks in which the first storage data is stored, to said first disk array system other than said first disk array system that has sent the request to send said first storage data;
a sixth data receiving unit that receives the copy of the first storage data, as well as the first identifiers, from each of said first disk array systems other than said first disk array system that has sent the request to send the first storage data;
a seventh data operation controller that calculates an exclusive OR between copies of the first storage data and second storage data, said copies of the first storage data being the copies of the first storage data received by said sixth data receiving unit and corresponding to the first identifiers, said second storage data being stored in the second storage blocks of said second hard disk drives identified by the second identifiers corresponding to the first identifiers received by said sixth receiving unit; and
an eighth data sending unit that sends a calculation result of the exclusive OR calculated by said seventh data operation controller, as well as the first identifiers, to said first disk array system that has sent the request to send the first storage data, and,
said first disk array system further comprises:
a seventh data receiving unit that receives a calculation result of the exclusive OR calculated by said seventh data operation controller, as well as the first identifiers, from said second disk array system; and
a fifth disk controller that stores the calculation result of the exclusive OR, received by said seventh data receiving unit, into the first storage blocks of said first hard disk drives identified by the first identifiers received by said seventh data receiving unit.

* * * * *